(12) United States Patent
Messerly et al.

(10) Patent No.: US 12,543,968 B2
(45) Date of Patent: Feb. 10, 2026

(54) INTEGRATED SYSTEM FOR INTRAVASCULAR PLACEMENT OF A CATHETER

(71) Applicant: C. R. Bard, Inc., Murray Hill, NJ (US)

(72) Inventors: Shayne Messerly, Kaysville, UT (US); Matthew W. Bown, West Bountiful, UT (US); Eddie K. Burnside, Bountiful, UT (US); Kelly J. Christian, Draper, UT (US)

(73) Assignee: C. R. Bard, Inc., Franklin Lakes, NJ (US)

( * ) Notice: Subject to any disclaimer, the term of this patent is extended or adjusted under 35 U.S.C. 154(b) by 2080 days.

(21) Appl. No.: 16/206,890

(22) Filed: Nov. 30, 2018

(65) Prior Publication Data

US 2019/0099108 A1 Apr. 4, 2019

Related U.S. Application Data

(63) Continuation of application No. 13/890,158, filed on May 8, 2013, now Pat. No. 10,165,962, which is a
(Continued)

(51) Int. Cl.
*A61B 5/06* (2006.01)
*A61B 5/00* (2006.01)
(Continued)

(52) U.S. Cl.
CPC .............. *A61B 5/062* (2013.01); *A61B 5/06* (2013.01); *A61B 5/283* (2021.01); *A61B 5/287* (2021.01);
(Continued)

(58) Field of Classification Search
CPC ............................... A61B 5/283; A61B 5/287
See application file for complete search history.

(56) References Cited

U.S. PATENT DOCUMENTS

| 4,445,501 A | 5/1984 | Bresler |
| 4,905,698 A | 3/1990 | Strohl, Jr. et al. |
(Continued)

FOREIGN PATENT DOCUMENTS

| CA | 2420676 C | 7/2010 |
| EP | 0153021 A1 | 8/1985 |
(Continued)

*Primary Examiner* — Angela M Hoffa
(74) *Attorney, Agent, or Firm* — Rutan & Tucker LLP

(57) ABSTRACT

A catheter placement system includes a catheter assembly, an external ultrasound probe, a tip location sensor, and a console. The catheter assembly includes a catheter, a magnetic component producing a magnetic field, and an electrocardiogram (ECG) sensor designed to measure an intravascular ECG signal. The external ultrasound probe includes user input controls. The tip location sensor is configured to detect the magnetic field of the magnetic component when the catheter is disposed in the patient, the magnetic field providing magnetic field information for locating the magnetic component relative to the tip location sensor, and to receive the intravascular ECG signal from the ECG sensor. The console is coupled to the tip location sensor and includes a processor and a display. The display is configured to show an image from the external ultrasound probe, a graphical representation of the magnetic component, and successive ECG waveforms detected by the ECG sensor.

19 Claims, 14 Drawing Sheets

Related U.S. Application Data continuation of application No. 13/665,420, filed on Oct. 31, 2012, now Pat. No. 9,999,371, which is a continuation of application No. 12/323,273, filed on Nov. 25, 2008, now Pat. No. 8,388,541.

(60) Provisional application No. 61/095,921, filed on Sep. 10, 2008, provisional application No. 61/095,451, filed on Sep. 9, 2008, provisional application No. 61/091,233, filed on Aug. 22, 2008, provisional application No. 61/045,944, filed on Apr. 17, 2008, provisional application No. 60/990,242, filed on Nov. 26, 2007.

(51) Int. Cl.
| | | |
|---|---|---|
| *A61B 5/283* | (2021.01) | |
| *A61B 5/287* | (2021.01) | |
| *A61B 8/00* | (2006.01) | |
| *A61B 8/08* | (2006.01) | |
| *A61B 34/20* | (2016.01) | |
| *A61B 46/00* | (2016.01) | |
| *A61B 46/10* | (2016.01) | |
| *A61B 34/00* | (2016.01) | |
| *A61B 90/00* | (2016.01) | |
| *A61B 90/40* | (2016.01) | |

(52) U.S. Cl.
CPC ............ *A61B 5/6852* (2013.01); *A61B 5/742* (2013.01); *A61B 8/0841* (2013.01); *A61B 8/463* (2013.01); *A61B 8/467* (2013.01); *A61B 34/20* (2016.02); *A61B 46/00* (2016.02); *A61B 46/10* (2016.02); *A61B 8/0833* (2013.01); *A61B 8/0891* (2013.01); *A61B 2034/2051* (2016.02); *A61B 34/25* (2016.02); *A61B 2090/372* (2016.02); *A61B 2090/378* (2016.02); *A61B 2090/3954* (2016.02); *A61B 90/40* (2016.02); *A61B 2560/0276* (2013.01)

(56) References Cited

U.S. PATENT DOCUMENTS

| | | | |
|---|---|---|---|
| 5,042,486 | A | 8/1991 | Pfeiler et al. |
| 5,211,165 | A | 5/1993 | Dumoulin et al. |
| 5,255,680 | A | 10/1993 | Darrow et al. |
| 5,265,610 | A | 11/1993 | Darrow et al. |
| 5,377,678 | A | 1/1995 | Dumoulin et al. |
| 5,398,691 | A | 3/1995 | Martin et al. |
| 5,480,422 | A * | 1/1996 | Ben-Haim ............ A61B 5/062 607/122 |
| 5,592,939 | A | 1/1997 | Martinelli |
| 5,638,819 | A | 6/1997 | Manwaring et al. |
| 5,645,065 | A | 7/1997 | Shapiro et al. |
| 5,682,890 | A | 11/1997 | Kormos et al. |
| 5,711,299 | A | 1/1998 | Manwaring et al. |
| 5,727,552 | A | 3/1998 | Ryan |
| 5,727,553 | A | 3/1998 | Saad |
| 5,729,129 | A | 3/1998 | Acker |
| 5,748,767 | A | 5/1998 | Raab |
| 5,752,513 | A | 5/1998 | Acker et al. |
| 5,762,064 | A | 6/1998 | Polvani |
| 5,769,843 | A | 6/1998 | Abela et al. |
| 5,776,064 | A | 7/1998 | Kalfas et al. |
| 5,833,608 | A | 11/1998 | Acker |
| 5,840,031 | A | 11/1998 | Crowley |
| 5,843,076 | A | 12/1998 | Webster, Jr. et al. |
| 5,899,860 | A | 5/1999 | Pfeiffer et al. |
| 5,902,238 | A | 5/1999 | Golden et al. |
| 5,944,022 | A | 8/1999 | Nardella et al. |
| 5,944,023 | A | 8/1999 | Johnson et al. |
| 5,983,126 | A | 11/1999 | Wittkampf |
| 5,997,473 | A | 12/1999 | Taniguchi et al. |
| 6,019,725 | A | 2/2000 | Vesely et al. |
| 6,052,610 | A | 4/2000 | Koch |
| 6,073,043 | A | 6/2000 | Schneider |
| 6,082,366 | A | 7/2000 | Andra et al. |
| 6,211,666 | B1 | 4/2001 | Acker |
| 6,216,029 | B1 | 4/2001 | Paltieli |
| 6,226,547 | B1 | 5/2001 | Lockhart et al. |
| 6,246,898 | B1 | 6/2001 | Vesely et al. |
| 6,248,074 | B1 | 6/2001 | Ohno et al. |
| 6,266,552 | B1 | 7/2001 | Slettenmark |
| 6,275,724 | B1 | 8/2001 | Dickinson et al. |
| 6,370,411 | B1 | 4/2002 | Osadchy et al. |
| 6,427,079 | B1 | 7/2002 | Schneider et al. |
| 6,466,815 | B1 | 10/2002 | Saito et al. |
| 6,474,341 | B1 | 11/2002 | Hunter et al. |
| 6,484,118 | B1 | 11/2002 | Govari |
| 6,493,573 | B1 | 12/2002 | Martinelli et al. |
| 6,507,751 | B2 | 1/2003 | Blume et al. |
| 6,516,807 | B1 | 2/2003 | Panescu et al. |
| 6,522,909 | B1 | 2/2003 | Garibaldi et al. |
| 6,528,991 | B2 | 3/2003 | Ashe |
| 6,529,761 | B2 | 3/2003 | Creighton, IV et al. |
| 6,542,766 | B2 | 4/2003 | Hall et al. |
| 6,546,279 | B1 | 4/2003 | Bova et al. |
| 6,611,141 | B1 | 8/2003 | Schulz et al. |
| 6,615,155 | B2 | 9/2003 | Gilboa |
| 6,618,612 | B1 | 9/2003 | Acker et al. |
| 6,626,832 | B1 | 9/2003 | Paltieli et al. |
| 6,662,034 | B2 | 12/2003 | Segner et al. |
| 6,701,179 | B1 | 3/2004 | Martinelli et al. |
| 6,757,557 | B1 | 6/2004 | Bladen et al. |
| 6,764,449 | B2 | 7/2004 | Lee et al. |
| 6,772,001 | B2 | 8/2004 | Maschke |
| 6,856,823 | B2 | 2/2005 | Ashe |
| 6,875,179 | B2 | 4/2005 | Ferguson et al. |
| 6,911,026 | B1 | 6/2005 | Hall et al. |
| 6,934,575 | B2 | 8/2005 | Ferre et al. |
| 6,947,788 | B2 | 9/2005 | Gilboa et al. |
| 6,968,846 | B2 | 11/2005 | Viswanathan |
| 6,980,843 | B2 | 12/2005 | Eng et al. |
| 7,020,512 | B2 | 3/2006 | Ritter et al. |
| 7,072,704 | B2 | 7/2006 | Bucholz |
| 7,090,639 | B2 | 8/2006 | Govari |
| 7,096,148 | B2 | 8/2006 | Anderson et al. |
| 7,167,738 | B2 | 1/2007 | Schweikard et al. |
| 7,174,201 | B2 | 2/2007 | Govari et al. |
| 7,366,563 | B2 | 4/2008 | Kleen et al. |
| 7,543,239 | B2 | 6/2009 | Viswanathan et al. |
| 7,729,743 | B2 | 6/2010 | Sabczynski et al. |
| 7,774,051 | B2 | 8/2010 | Voth |
| 7,822,464 | B2 | 10/2010 | Maschke et al. |
| 7,831,294 | B2 | 11/2010 | Viswanathan |
| 7,869,865 | B2 | 1/2011 | Govari et al. |
| 8,055,327 | B2 | 11/2011 | Strommer et al. |
| 8,123,691 | B2 | 2/2012 | Mine et al. |
| 8,200,313 | B1 | 6/2012 | Rambod et al. |
| 8,346,343 | B2 | 1/2013 | Kimura et al. |
| 8,388,541 | B2 * | 3/2013 | Messerly ............... A61B 8/467 600/422 |
| 8,391,956 | B2 | 3/2013 | Zellers et al. |
| 8,400,164 | B2 | 3/2013 | Osadchy et al. |
| 8,401,616 | B2 | 3/2013 | Verard et al. |
| 8,442,621 | B2 | 5/2013 | Gorek et al. |
| 8,447,384 | B2 | 5/2013 | Xu et al. |
| 8,538,509 | B2 | 9/2013 | Harlev et al. |
| 8,690,776 | B2 | 4/2014 | Razzaque et al. |
| 8,721,655 | B2 | 5/2014 | Viswanathan et al. |
| 8,734,440 | B2 | 5/2014 | Wu |
| 8,942,784 | B2 | 1/2015 | Neidert et al. |
| 8,965,490 | B2 | 2/2015 | Lee et al. |
| 9,014,794 | B2 | 4/2015 | Brodnick et al. |
| 9,179,860 | B2 | 11/2015 | Markowitz et al. |
| 9,468,413 | B2 | 10/2016 | Hall et al. |
| 9,681,823 | B2 * | 6/2017 | Messerly ............. A61B 8/0841 |
| 9,999,371 | B2 * | 6/2018 | Messerly ............... A61B 34/20 |
| 10,165,962 | B2 * | 1/2019 | Messerly ............. A61B 8/0841 |
| 10,966,630 | B2 * | 4/2021 | Messerly ............. A61B 46/10 |
| 11,707,205 | B2 * | 7/2023 | Messerly .................. A61B 5/06 600/374 |

(56) References Cited

U.S. PATENT DOCUMENTS

| | | | |
|---|---|---|---|
| 11,779,240 B2 * | 10/2023 | Cox | A61B 34/20 600/509 |
| 2002/0156363 A1 | 10/2002 | Hunter et al. | |
| 2003/0036696 A1 | 2/2003 | Willis et al. | |
| 2003/0040743 A1 | 2/2003 | Cosman et al. | |
| 2003/0073901 A1 | 4/2003 | Simon et al. | |
| 2003/0120150 A1 | 6/2003 | Govari | |
| 2003/0163142 A1 | 8/2003 | Paltieli et al. | |
| 2003/0236445 A1 | 12/2003 | Couvillon, Jr. | |
| 2004/0059217 A1 | 3/2004 | Kessman et al. | |
| 2004/0097803 A1 | 5/2004 | Panescu | |
| 2004/0097804 A1 | 5/2004 | Sobe | |
| 2004/0097805 A1 * | 5/2004 | Verard | A61B 34/20 600/428 |
| 2004/0147837 A1 | 7/2004 | Macaulay et al. | |
| 2004/0162487 A1 | 8/2004 | Klingenbeck-Regn et al. | |
| 2005/0004450 A1 | 1/2005 | Ben-Haim et al. | |
| 2005/0049486 A1 | 3/2005 | Urquhart et al. | |
| 2005/0075561 A1 | 4/2005 | Golden | |
| 2006/0149134 A1 | 7/2006 | Soper et al. | |
| 2006/0241397 A1 | 10/2006 | Govari et al. | |
| 2006/0253029 A1 | 11/2006 | Altmann et al. | |
| 2006/0258895 A1 | 11/2006 | Maschke | |
| 2006/0287595 A1 | 12/2006 | Maschke | |
| 2007/0013540 A1 | 1/2007 | Altmann et al. | |
| 2007/0016013 A1 | 1/2007 | Camus | |
| 2007/0049817 A1 | 3/2007 | Preiss et al. | |
| 2007/0055141 A1 | 3/2007 | Kruger et al. | |
| 2007/0066888 A1 | 3/2007 | Maschke | |
| 2007/0135886 A1 | 6/2007 | Maschke | |
| 2007/0167743 A1 | 7/2007 | Honda et al. | |
| 2007/0197905 A1 | 8/2007 | Timinger et al. | |
| 2007/0232882 A1 | 10/2007 | Glossop et al. | |
| 2007/0232896 A1 | 10/2007 | Gilboa et al. | |
| 2007/0238984 A1 | 10/2007 | Maschke et al. | |
| 2007/0265526 A1 | 11/2007 | Govari et al. | |
| 2007/0299352 A1 | 12/2007 | Harlev et al. | |
| 2008/0033282 A1 | 2/2008 | Bar-Tal et al. | |
| 2008/0097232 A1 * | 4/2008 | Rothenberg | A61B 5/349 600/509 |
| 2008/0137927 A1 | 6/2008 | Altmann et al. | |
| 2008/0171934 A1 | 7/2008 | Greenan et al. | |
| 2008/0190438 A1 | 8/2008 | Harlev et al. | |
| 2008/0262338 A1 | 10/2008 | Paitel et al. | |
| 2009/0062646 A1 | 3/2009 | Creighton, IV et al. | |
| 2009/0156926 A1 * | 6/2009 | Messerly | A61B 34/20 600/409 |
| 2009/0182224 A1 | 7/2009 | Shmarak et al. | |
| 2010/0036238 A1 | 2/2010 | Neidert et al. | |
| 2010/0057157 A1 | 3/2010 | Govari et al. | |
| 2010/0060472 A1 | 3/2010 | Kimura et al. | |
| 2010/0106011 A1 | 4/2010 | Byrd et al. | |
| 2010/0160772 A1 | 6/2010 | Gardeski et al. | |
| 2010/0168557 A1 | 7/2010 | Deno et al. | |
| 2010/0274150 A1 | 10/2010 | Harlev et al. | |
| 2012/0035539 A1 | 2/2012 | Tegg | |
| 2012/0220854 A1 * | 8/2012 | Messerly | A61B 5/742 600/409 |
| 2012/0296213 A1 | 11/2012 | Mauldin, Jr. et al. | |
| 2013/0006100 A1 | 1/2013 | Shachar et al. | |
| 2013/0060116 A1 * | 3/2013 | Messerly | A61B 5/287 600/374 |
| 2013/0079628 A1 | 3/2013 | Groszmann et al. | |
| 2013/0085416 A1 | 4/2013 | Mest | |
| 2013/0131503 A1 | 5/2013 | Schneider et al. | |
| 2013/0169272 A1 | 7/2013 | Eichler et al. | |
| 2013/0223702 A1 | 8/2013 | Holsing et al. | |
| 2013/0245434 A1 * | 9/2013 | Messerly | A61B 34/20 600/424 |
| 2013/0296691 A1 | 11/2013 | Ashe | |
| 2013/0345555 A1 | 12/2013 | Kanade et al. | |
| 2014/0094768 A1 | 4/2014 | Stangenes et al. | |
| 2014/0180074 A1 | 6/2014 | Green et al. | |
| 2014/0187917 A1 | 7/2014 | Clark et al. | |
| 2014/0249428 A1 | 9/2014 | Ingold, Jr. et al. | |
| 2014/0253270 A1 | 9/2014 | Nicholls et al. | |
| 2014/0257080 A1 | 9/2014 | Dunbar et al. | |
| 2014/0275990 A1 | 9/2014 | Hagy et al. | |
| 2014/0276010 A1 | 9/2014 | Anderson | |
| 2015/0005621 A1 | 1/2015 | Liu | |
| 2015/0025365 A1 | 1/2015 | Esguerra Wilczynski et al. | |
| 2015/0223775 A1 | 8/2015 | Hamilton, Jr. | |
| 2015/0282734 A1 | 10/2015 | Schweikert et al. | |
| 2017/0086782 A1 | 3/2017 | Hagy et al. | |
| 2017/0281029 A1 * | 10/2017 | Messerly | A61B 34/20 |
| 2018/0116723 A1 | 5/2018 | Hettrick et al. | |
| 2018/0145443 A1 | 5/2018 | Andreason et al. | |
| 2018/0161012 A1 | 6/2018 | Bang et al. | |
| 2018/0199914 A1 | 7/2018 | Ramachandran et al. | |
| 2018/0296122 A1 * | 10/2018 | Messerly | A61B 5/062 |
| 2019/0216423 A1 | 7/2019 | Ko et al. | |
| 2019/0261886 A1 | 8/2019 | King et al. | |
| 2021/0077201 A1 * | 3/2021 | Cox | A61B 46/10 |
| 2023/0233262 A9 * | 7/2023 | Cox | A61B 46/00 600/509 |

FOREIGN PATENT DOCUMENTS

| | | |
|---|---|---|
| EP | 1717601 A2 | 11/2006 |
| EP | 2170162 B1 | 8/2017 |
| JP | 2001514533 A | 9/2001 |
| JP | 2002529133 A | 9/2002 |
| RU | 2009101949 A | 7/2010 |
| WO | 2006074509 A1 | 7/2006 |
| WO | 2006074510 A1 | 7/2006 |
| WO | 2006078677 A2 | 7/2006 |
| WO | 2008136008 A2 | 11/2008 |
| WO | 2013034175 A1 | 3/2013 |

* cited by examiner

INTEGRATED SYSTEM FOR INTRAVASCULAR PLACEMENT OF A CATHETER

CROSS-REFERENCE TO RELATED APPLICATIONS

This application is a continuation of U.S. patent application Ser. No. 13/890,158, filed May 8, 2013, now U.S. Pat. No. 10,165,962, which is a continuation of U.S. patent application Ser. No. 13/665,420, filed Oct. 31, 2012, now U.S. Pat. No. 9,999,371, which is a continuation of U.S. patent application Ser. No. 12/323,273, filed Nov. 25, 2008, now U.S. Pat. No. 8,388,541, which claims the benefit of U.S. Provisional Application No. 60/990,242, filed Nov. 26, 2007, U.S. Provisional Application No. 61/095,921, filed Sep. 10, 2008, U.S. Provisional Application No. 61/091,233, filed Aug. 22, 2008, U.S. Provisional Application No. 61/095,451, filed Sep. 9, 2008, and U.S. Provisional Application No. 61/045,944, filed Apr. 17, 2008, each of which is incorporated herein by reference in its entirety.

BRIEF SUMMARY

Briefly summarized, embodiments of the present invention are directed to an integrated catheter placement system configured for accurately placing a catheter within the vasculature of a patient. The integrated system employs at least two modalities for improving catheter placement accuracy: 1) ultrasound-assisted guidance for introducing the catheter into the patient's vasculature; and 2) a tip location system ("TLS"), or magnetically-based (e.g., via permanent magnet(s) or electromagnet(s)) tracking of the catheter tip during its advancement through the vasculature to detect and facilitate correction of any tip malposition during such advancement.

In one embodiment, the integrated system comprises a system console including a control processor, a tip location sensor for temporary placement on a portion of a body of the patient, and an ultrasound probe. The tip location sensor senses a magnetic field of a stylet disposed in a lumen of the catheter when the catheter is disposed in the vasculature. The ultrasound probe ultrasonically images a portion of the vasculature prior to introduction of the catheter into the vasculature. In addition, the ultrasound probe includes user input controls for controlling use of the ultrasound probe in an ultrasound mode and use of the tip location sensor in a tip location mode.

In another embodiment, a third modality, i.e., ECG signal-based catheter tip guidance, is included in the system to enable guidance of the catheter tip to a desired position with respect to a node of the patient's heart from which the ECG signals originate.

These and other features of embodiments of the present invention will become more fully apparent from the following description and appended claims, or may be learned by the practice of embodiments of the invention as set forth hereinafter.

BRIEF DESCRIPTION OF THE DRAWINGS

A more particular description of the present disclosure will be rendered by reference to specific embodiments thereof that are illustrated in the appended drawings. It is appreciated that these drawings depict only typical embodiments of the invention and are therefore not to be considered limiting of its scope. Example embodiments of the invention will be described and explained with additional specificity and detail through the use of the accompanying drawings in which.

DETAILED DESCRIPTION OF SELECTED EMBODIMENTS

Reference will now be made to figures wherein like structures will be provided with like reference designations. It is understood that the drawings are diagrammatic and schematic representations of exemplary embodiments of the present invention, and are neither limiting nor necessarily drawn to scale.

FIGS. 1-17 depict various features of embodiments of the present invention, which is generally directed to a catheter placement system configured for accurately placing a catheter within the vasculature of a patient. In one embodiment, the catheter placement system employs at least two modalities for improving catheter placement accuracy: 1) ultrasound-assisted guidance for introducing the catheter into the patient's vasculature; and 2) a tip location/navigation system ("TLS"), or magnetically-based tracking of the catheter tip during its advancement through the tortuous vasculature path to detect and facilitate correction of any tip malposition during such advancement. The ultrasound guidance and tip location features of the present system according to one embodiment are integrated into a single device for use by a clinician placing the catheter. Integration of these two modalities into a single device simplifies the catheter placement process and results in relatively faster catheter placements. For instance, the integrated catheter placement system enables ultrasound and TLS activities to be viewed from a single display of the integrated system. Also, controls located on an ultrasound probe of the integrated device, which probe is maintained within the sterile field of the patient during catheter placement, can be used to control functionality of the system, thus precluding the need for a clinician to reach out of the sterile field in order to control the system.

In another embodiment, a third modality, i.e., ECG signal-based catheter tip guidance, is included in the integrated system to enable guidance of the catheter tip to a desired position with respect to a node of the patient's heart from which the ECG signals originate. Such ECG-based positional assistance is also referred to herein as "tip confirmation."

Combination of the three modalities above according to one embodiment enables the catheter placement system to facilitate catheter placement within the patient's vasculature with a relatively high level of accuracy, i.e., placement of the distal tip of the catheter in a predetermined and desired position. Moreover, because of the ECG-based guidance of the catheter tip, correct tip placement may be confirmed without the need for a confirmatory X-ray. This, in turn, reduces the patient's exposure to potentially harmful x-rays, the cost and time involved in transporting the patient to and from the x-ray department, costly and inconvenient catheter repositioning procedures, etc.

Figure 1:
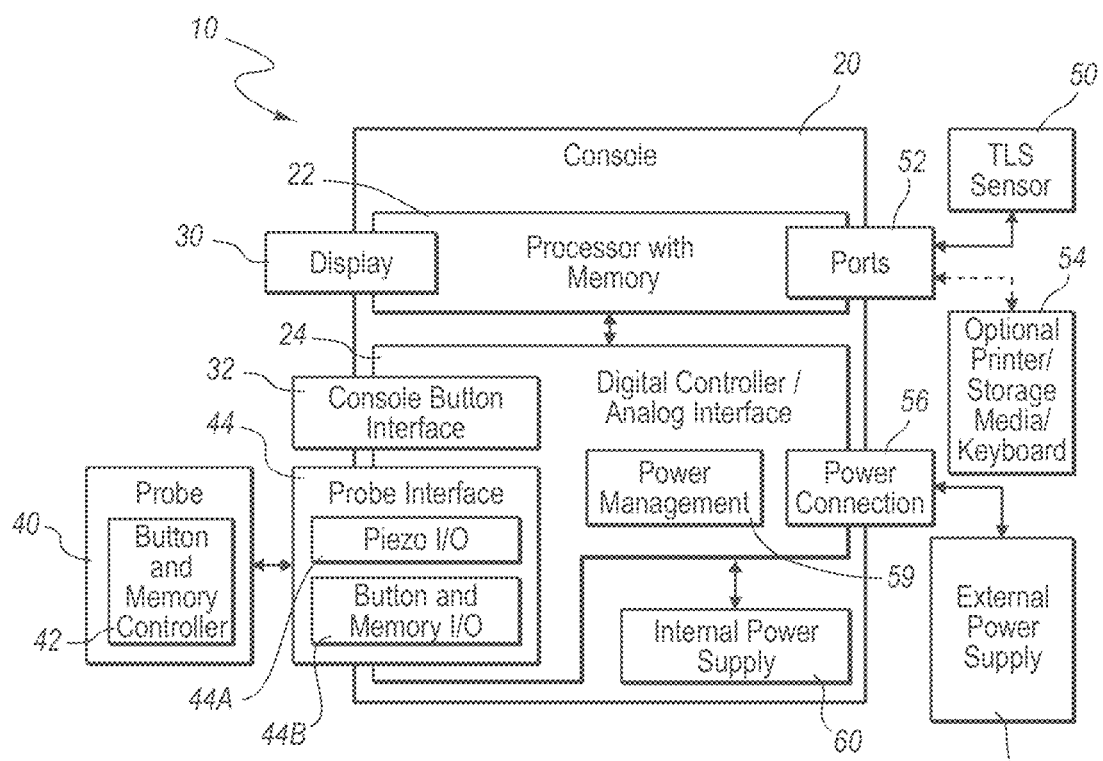
FIG. 1 is a block diagram depicting various elements of an integrated system for intravascular placement of a catheter, according to one example embodiment of the present invention.
Figure 2:
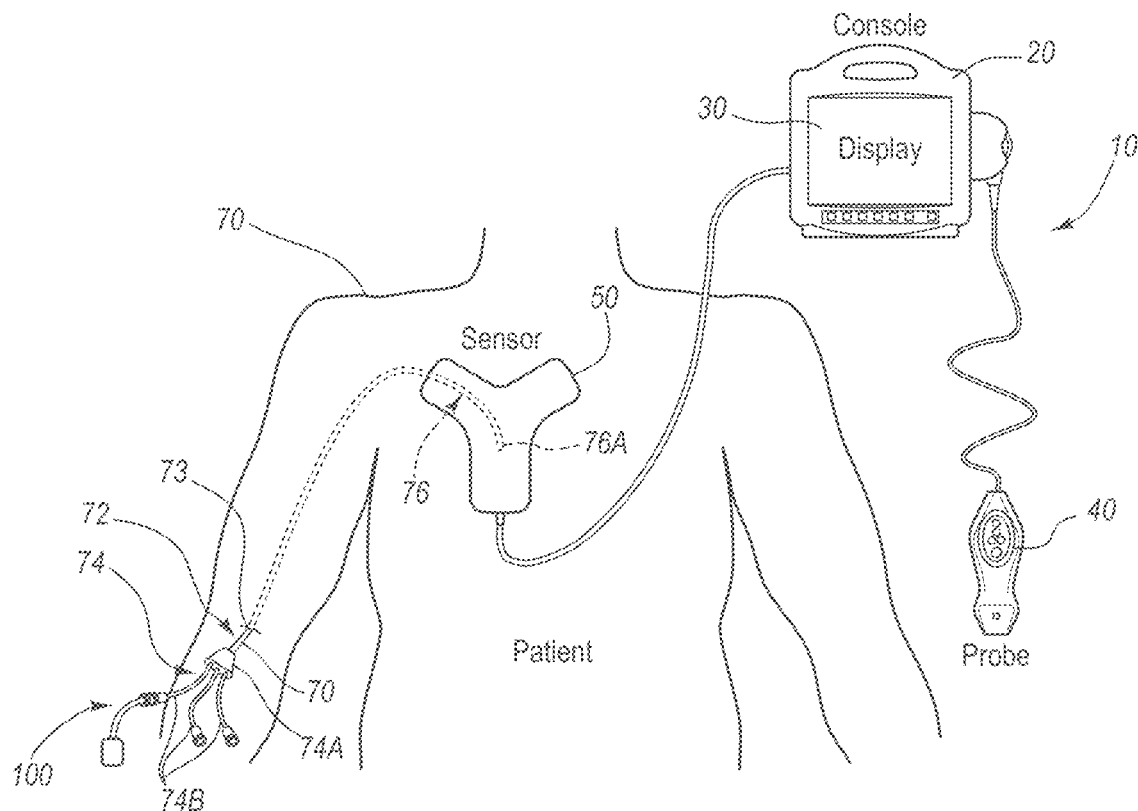
FIG. 2 is a simplified view of a patient and a catheter being inserted therein with assistance of the integrated system of FIG. 1.

Reference is first made to FIGS. 1 and 2 which depict various components of a catheter placement system ("system"), generally designated at 10, configured in accordance with one example embodiment of the present invention. As shown, the system 10 generally includes a console 20, display 30, probe 40, and sensor 50, each of which is described in further detail below.

FIG. 2 shows the general relation of these components to a patient 70 during a procedure to place a catheter 72 into the patient vasculature through a skin insertion site 73. FIG. 2 shows that the catheter 72 generally includes a proximal portion 74 that remains exterior to the patient and a distal potion 76 that resides within the patient vasculature after placement is complete. The system 10 is employed to ultimately position a distal tip 76A of the catheter 72 in a desired position within the patient vasculature. In one embodiment, the desired position for the catheter distal tip 76A is proximate the patient's heart, such as in the lower one-third ($⅓^{rd}$) portion of the Superior Vena Cava ("SVC"). Of course, the system 10 can be employed to place the catheter distal tip in other locations. The catheter proximal portion 74 further includes a hub 74A that provides fluid communication between the one or more lumens of the catheter 72 and one or more extension legs 74B extending proximally from the hub.

Figure 8A:
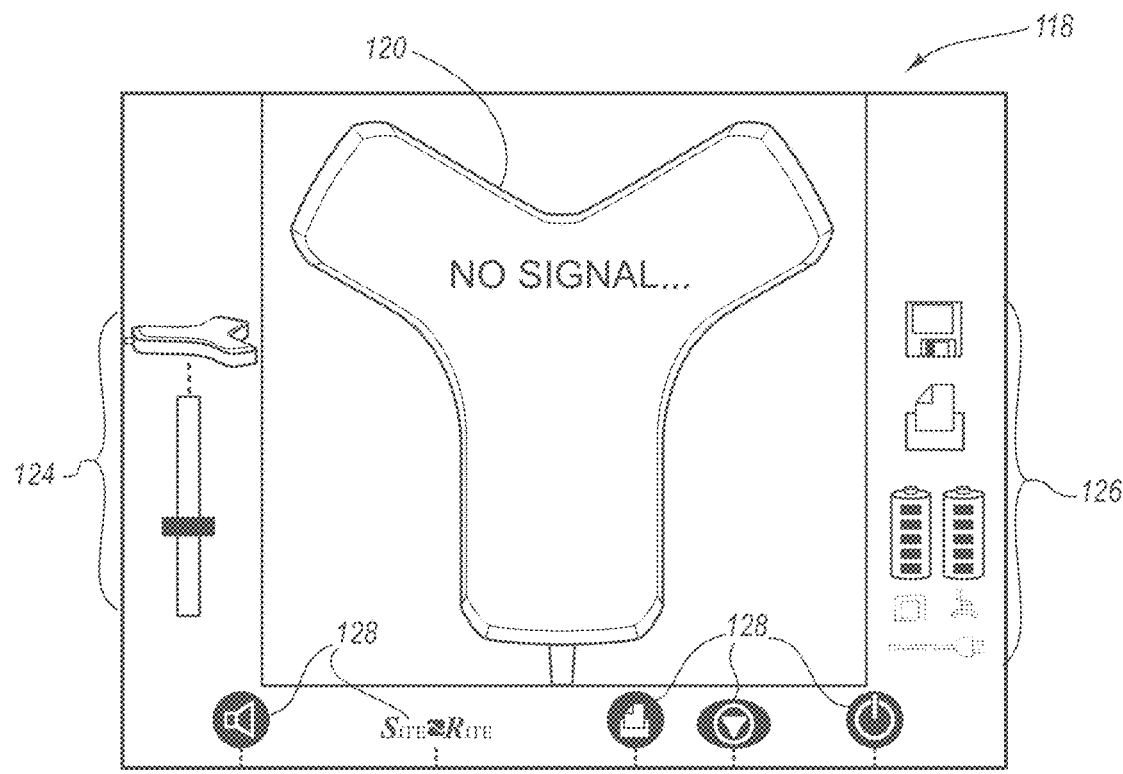
FIGS. 8A-8C are screenshots of images depicted on a display of the integrated system of FIG. 1 during catheter tip placement procedures.
Figure 8B:
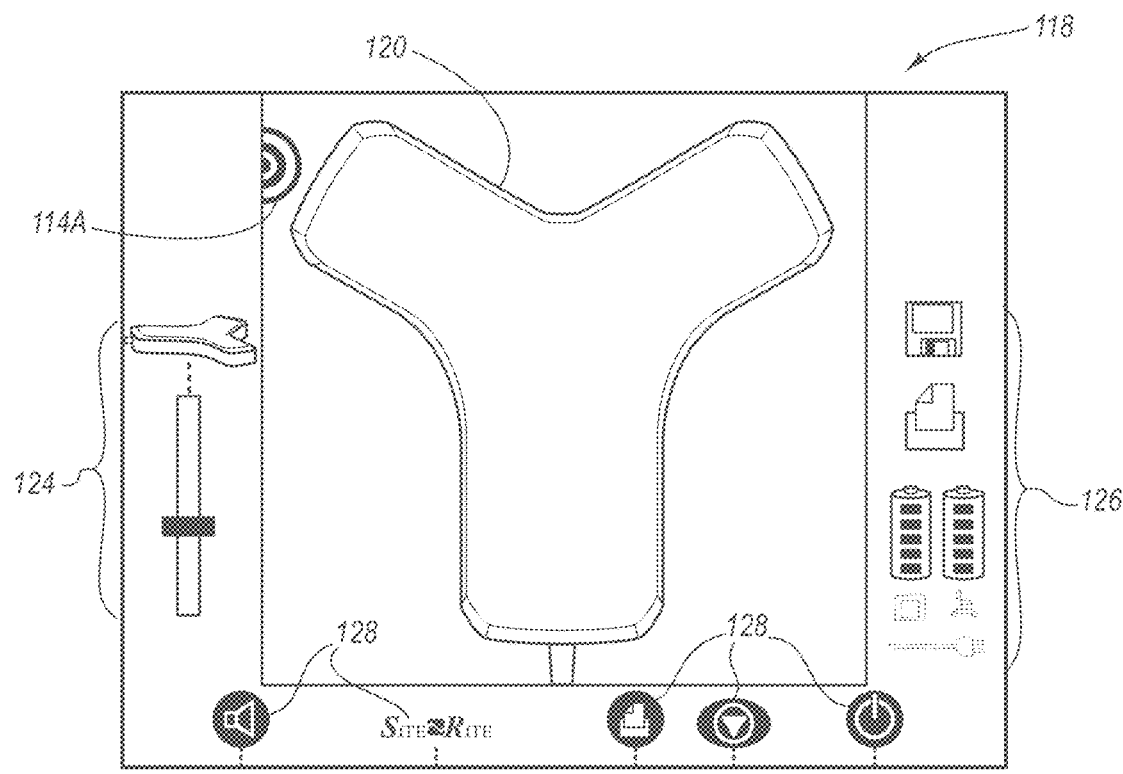
Figure 8C:
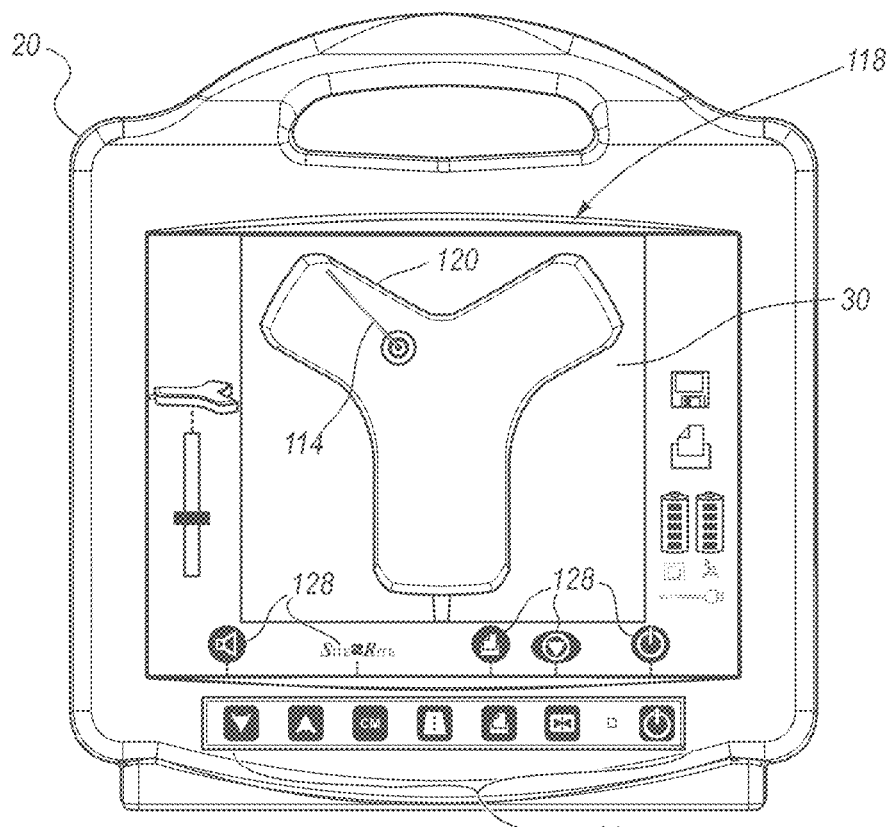

An example implementation of the console 20 is shown in FIG. 8C, though it is appreciated that the console can take one of a variety of forms. A processor 22, including non-volatile memory such as EEPROM for instance, is included in the console 20 for controlling system function during operation of the system 10, thus acting as a control processor. A digital controller/analog interface 24 is also included with the console 20 and is in communication with both the processor 22 and other system components to govern interfacing between the probe 40, sensor 50, and other system components.

The system 10 further includes ports 52 for connection with the sensor 50 and optional components 54 including a printer, storage media, keyboard, etc. The ports in one embodiment are USB ports, though other port types or a combination of port types can be used for this and the other interfaces connections described herein. A power connection 56 is included with the console 20 to enable operable connection to an external power supply 58. An internal battery 60 can also be employed, either with or exclusive of an external power supply. Power management circuitry 59 is included with the digital controller/analog interface 24 of the console to regulate power use and distribution.

The display 30 in the present embodiment is integrated into the console 20 and is used to display information to the clinician during the catheter placement procedure. In another embodiment, the display may be separate from the console. As will be seen, the content depicted by the display 30 changes according to which mode the catheter placement system is in: US, TLS, or in other embodiments, ECG tip confirmation. In one embodiment, a console button interface 32 (see FIGS. 1, 8C) and buttons included on the probe 40 can be used to immediately call up a desired mode to the display 30 by the clinician to assist in the placement procedure. In one embodiment, information from multiple modes, such as TLS and ECG, may be displayed simultaneously, such as in FIG. 17. Thus, the single display 30 of the system console 20 can be employed for ultrasound guidance in accessing a patient's vasculature, TLS guidance during catheter advancement through the vasculature, and (as in later embodiments) ECG-based confirmation of catheter distal tip placement with respect to a node of the patient's heart. In one embodiment, the display 30 is an LCD device.

Figure 3A:
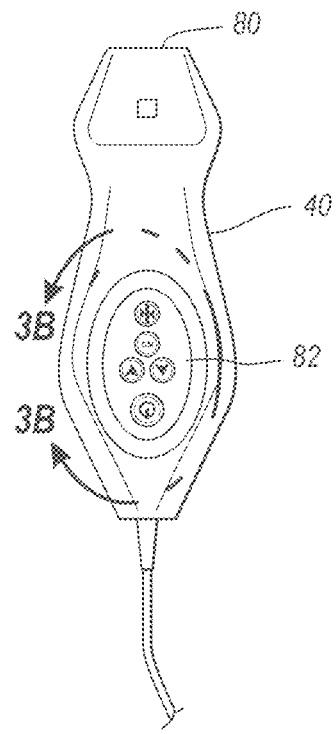
FIGS. 3A and 3B are views of a probe of the integrated system of FIG. 1.
Figure 3B:
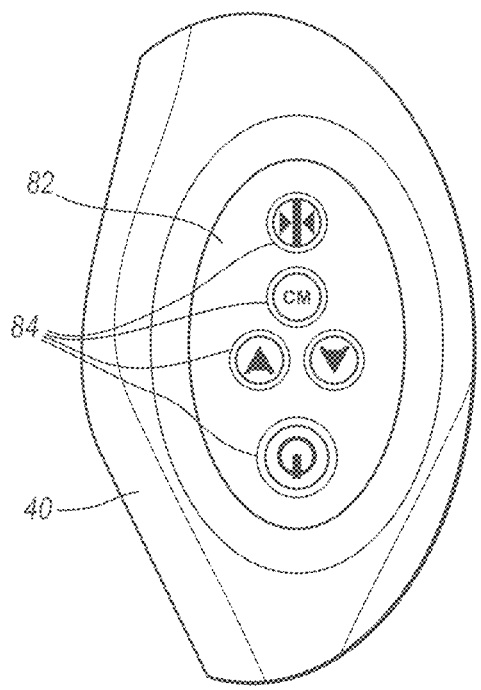

FIGS. 3A and 3B depict features of the probe 40 according to one embodiment. The probe 40 is employed in connection with the first modality mentioned above, i.e., ultrasound ("US")-based visualization of a vessel, such as a vein, in preparation for insertion of the catheter 72 into the vasculature. Such visualization gives real time ultrasound guidance for introducing the catheter into the vasculature of the patient and assists in reducing complications typically associated with such introduction, including inadvertent arterial puncture, hematoma, pneumothorax, etc.

The handheld probe 40 includes a head 80 that houses a piezoelectric array for producing ultrasonic pulses and for receiving echoes thereof after reflection by the patient's body when the head is placed against the patient's skin proximate the prospective insertion site 73 (FIG. 2). The probe 40 further includes a plurality of control buttons 84, which can be included on a button pad 82. In the present embodiment, the modality of the system 10 can be controlled by the control buttons 84, thus eliminating the need for the clinician to reach out of the sterile field, which is established about the patient insertion site prior to catheter placement, to change modes via use of the console button interface 32.

As such, in one embodiment a clinician employs the first (US) modality to determine a suitable insertion site and establish vascular access, such as with a needle or introducer, then with the catheter. The clinician can then seamlessly switch, via button pushes on the probe button pad 82, to the second (TLS) modality without having to reach out of the sterile field. The TLS mode can then be used to assist in advancement of the catheter 72 through the vasculature toward an intended destination.

FIG. 1 shows that the probe 40 further includes button and memory controller 42 for governing button and probe operation. The button and memory controller 42 can include non-volatile memory, such as EEPROM, in one embodiment. The button and memory controller 42 is in operable communication with a probe interface 44 of the console 20, which includes a piezo input/output component 44A for interfacing with the probe piezoelectric array and a button and memory input/output component 44B for interfacing with the button and memory controller 42.

Figure 4:
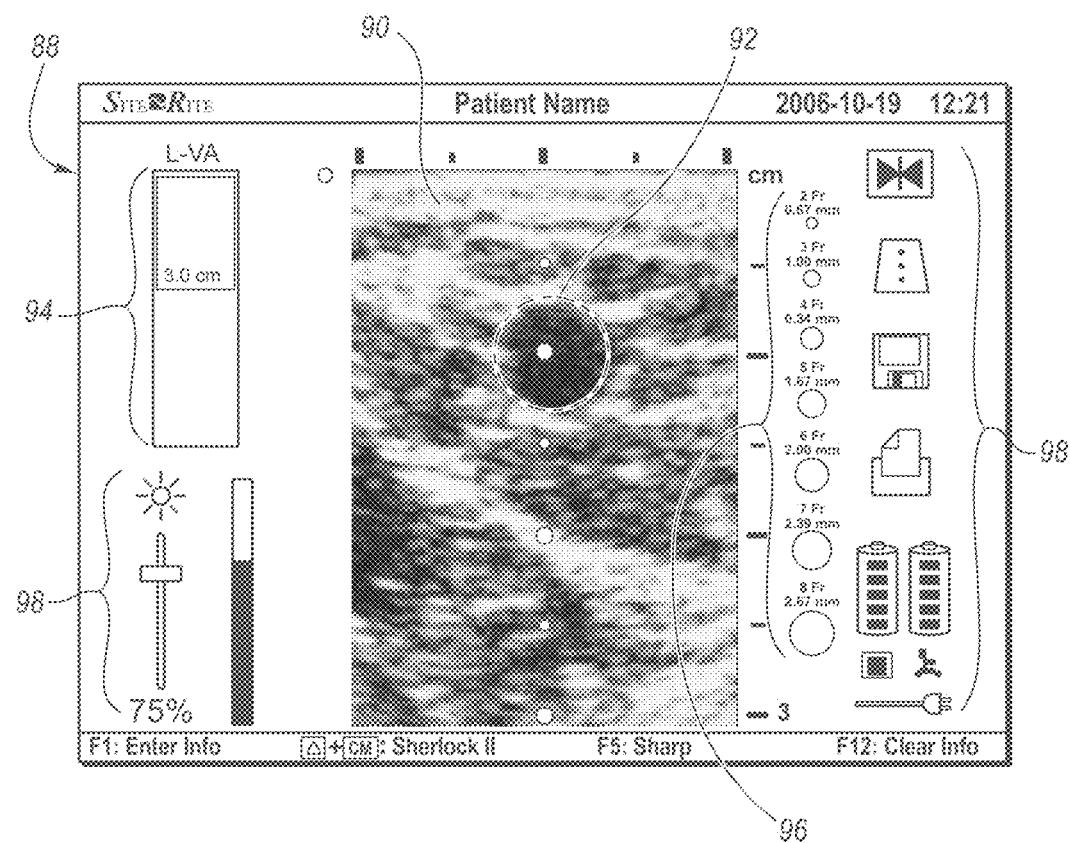
FIG. 4 is a screenshot of an ultrasound image as depicted on a display of the integrated system of FIG. 1.

FIG. 4 shows an example screenshot 88 as depicted on the display 30 while the system 10 is in its first ultrasound modality. An image 90 of a subcutaneous region of the patient 70 is shown, depicting a cross section of a vein 92. The image 90 is produced by operation of the piezoelectric array of the probe 40. also included on the display screenshot 88 is a depth scale indicator 94, providing information regarding the depth of the image 90 below the patient's skin, a lumen size scale 96 that provides information as to the size of the vein 92 relative to standard catheter lumen sizes, and other indicia 98 that provide information regarding status of the system 10 or possible actions to be taken, e.g., freeze frame, image templates, data save, image print, power status, image brightness, etc.

Note that while a vein is depicted in the image 90, other body lumens or portions can be imaged in other embodiments. Note that the US mode shown in FIG. 4 can be simultaneously depicted on the display 30 with other modes, such as the TLS mode, if desired. In addition to the visual display 30, aural information, such as beeps, tones, etc., can also be employed by the system 10 to assist the clinician during catheter placement. Moreover, the buttons included on the probe 40 and the console button interface 32 can be configured in a variety of ways, including the use of user input controls in addition to buttons, such as slide switches, toggle switches, electronic or touch-sensitive pads, etc. Additionally, both US and TLS activities can occur simultaneously or exclusively during use of the system 10.

As just described, the handheld ultrasound probe 40 is employed as part of the integrated catheter placement system 10 to enable US visualization of the peripheral vasculature of a patient in preparation for transcutaneous introduction of the catheter. In the present example embodiment, however, the probe is also employed to control functionality of the TLS portion, or second modality, of the system 10 when navigating the catheter toward its desired destination within the vasculature as described below. Again, as the probe 40 is used within the sterile field of the patient, this feature enables TLS functionality to be controlled entirely from within the sterile field. Thus the probe 40 is a dual-purpose device, enabling convenient control of both US and TLS functionality of the system 10 from the sterile field. In one embodiment, the probe can also be employed to control some or all ECG-related functionality, or third modality, of the catheter placement system 10, as described further below.

The catheter placement system 10 further includes the second modality mentioned above, i.e., the magnetically-based catheter TLS, or tip location system. The TLS enables the clinician to quickly locate and confirm the position and/or orientation of the catheter 72, such as a peripherally-inserted central catheter ("PICC"), central venous catheter ("CVC"), or other suitable catheter, during initial placement into and advancement through the vasculature of the patient 70. Specifically, the TLS modality detects a magnetic field generated by a magnetic element-equipped tip location stylet, which is pre-loaded in one embodiment into a longitudinally defined lumen of the catheter 72, thus enabling the clinician to ascertain the general location and orientation of the catheter tip within the patient body. In one embodiment, the magnetic assembly can be tracked using the teachings of one or more of the following U.S. Pat. Nos. 5,775,322; 5,879,297; 6,129,668; 6,216,028; and 6,263,230. The contents of the afore-mentioned U.S. patents are incorporated herein by reference in their entireties. The TLS also displays the direction in which the catheter tip is pointing, thus further assisting accurate catheter placement. The TLS further assists the clinician in determining when a malposition of the catheter tip has occurred, such as in the case where the tip has deviated from a desired venous path into another vein.

Figure 5:
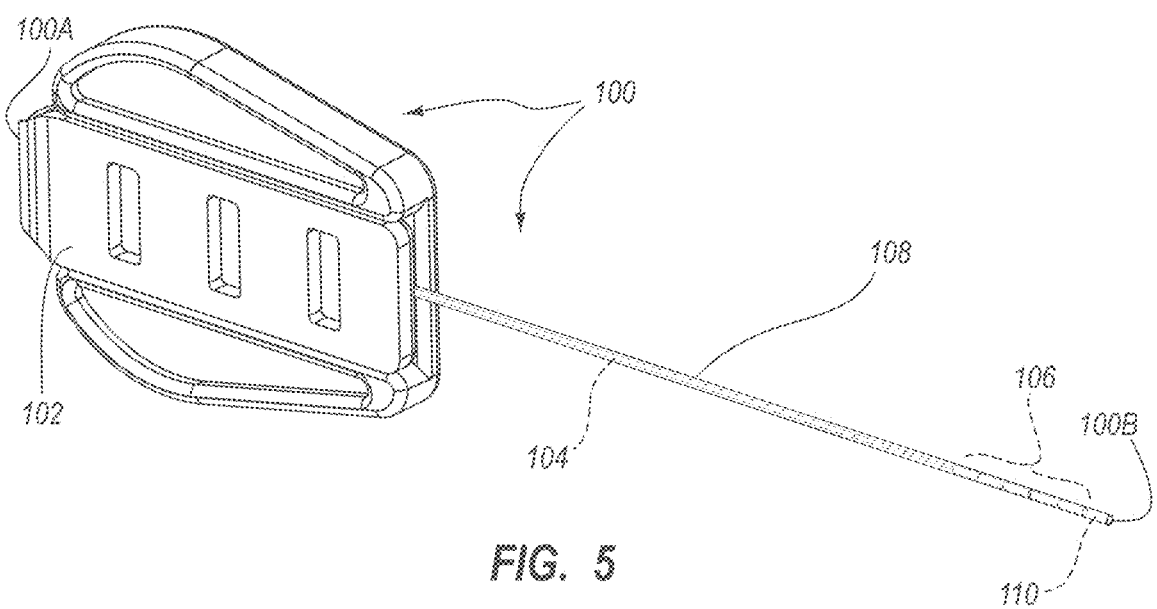
FIG. 5 is a perspective view of a stylet employed in connection with the system of FIG. 1 in placing a catheter within a patient vasculature.

As mentioned, the TLS utilizes a stylet to enable the distal end of the catheter 72 to be tracked during its advancement through the vasculature. FIG. 5 gives an example of such a stylet 100, which includes a proximal end 100A and a distal end 100B. A handle 102 is included at the stylet proximal end 100A, with a core wire 104 extending distally therefrom. A magnetic assembly is disposed distally of the core wire 104. The magnetic assembly includes one or more magnetic elements 106 disposed adjacent one another proximate the stylet distal end 100B and encapsulated by tubing 108. In the present embodiment, a plurality of magnetic elements 106 is included, each element including a solid, cylindrically shaped ferromagnetic stacked end-to-end with the other magnetic elements. An adhesive tip 110 can fill the distal tip of the tubing 108, distally to the magnetic elements 106.

Note that in other embodiments, the magnetic elements may vary from the design in not only shape, but also composition, number, size, magnetic type, and position in the stylet distal segment. For example, in one embodiment, the plurality of ferromagnetic magnetic elements is replaced with an electromagnetic assembly, such as an electromagnetic coil, which produces a magnetic field for detection by the sensor. Another example of an assembly usable here can be found in U.S. Pat. No. 5,099,845 entitled "Medical Instrument Location Means," which is incorporated herein by reference in its entirety. Yet other examples of stylets including magnetic elements that can be employed with the TLS modality can be found in U.S. Pat. No. 8,784,336, and entitled "Stylet Apparatuses and Methods of Manufacture," which is incorporated herein by reference in its entirety. These and other variations are therefore contemplated by embodiments of the present invention. It should appreciated herein that "stylet" as used herein can include any one of a variety of devices configured for removable placement within a lumen of the catheter to assist in placing a distal end of the catheter in a desired location within the patient's vasculature.

FIG. 2 shows disposal of the stylet 100 substantially within a lumen in the catheter 72 such that the proximal portion thereof extends proximally from the catheter lumen, through the hub 74A and out through a selected one of the extension legs 74B. So disposed within a lumen of the catheter, the distal end 100B of the stylet 100 is substantially co-terminal with the distal catheter end 76A such that detection by the TLS of the stylet distal end correspondingly indicates the location of the catheter distal end.

The TLS sensor 50 is employed by the system 10 during TLS operation to detect a magnetic field produced by the magnetic elements 106 of the stylet 100. As seen in FIG. 2, the TLS sensor 50 includes a Y-shaped housing formed of a trunk, a first branch extending from the trunk in a first direction, and a second branch extending from the trunk in a second direction. The TLS sensor 50 is placed on the chest of the patient during catheter insertion. The TLS sensor 50 is placed on the chest of the patient in a predetermined location, such as through the use of external body landmarks (e.g., the trunk positioned parallel to a sagittal plane of the patient), to enable the magnetic field of the stylet magnetic elements 106, disposed in the catheter 72 as described above, to be detected during catheter transit through the patient vasculature. Again, as the magnetic elements 106 of the stylet magnetic assembly are co-terminal with the distal end 76A of the catheter 72 (FIG. 2), detection by the TLS sensor 50 of the magnetic field of the magnetic elements provides information to the clinician as to the position and orientation of the catheter distal end during its transit.

In greater detail, the TLS sensor 50 is operably connected to the console 20 of the system 10 via one or more of the ports 52, as shown in FIG. 1. Note that other connection schemes between the TLS sensor and the system console can also be used without limitation. As just described, the magnetic elements 106 are employed in the stylet 100 to enable the position of the catheter distal end 76A (FIG. 2) to be observable relative to the TLS sensor 50 placed on the patient's chest. Detection by the TLS sensor 50 of the stylet magnetic elements 106 is graphically displayed on the display 30 of the console 20 during TLS mode. In this way, a clinician placing the catheter is able to generally determine the location of the catheter distal end 76A within the patient vasculature relative to the TLS sensor 50 and detect when catheter malposition, such as advancement of the catheter along an undesired vein, is occurring.

Figure 6:
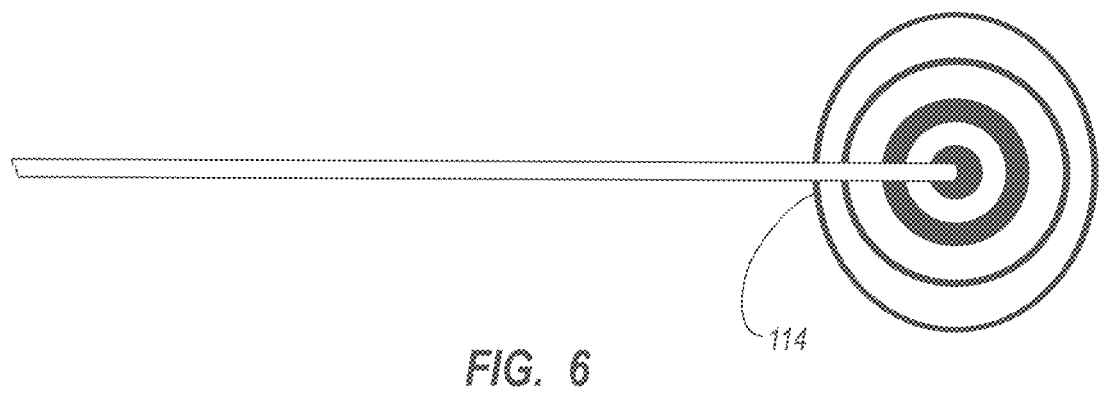
FIG. 6 is an icon as depicted on a display of the integrated system of FIG. 1, indicating a position of a distal end of the stylet of FIG. 5 during catheter tip placement procedures.
Figure 7A:
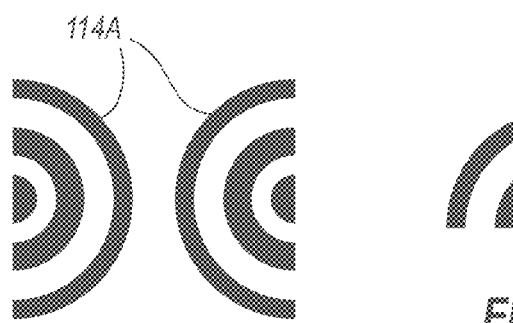
FIGS. 7A-7E depict various example icons that can be depicted on the display of the integrated system of FIG. 1 during catheter tip placement procedures.
Figure 7B:
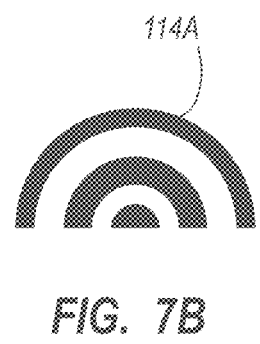
Figure 7C:
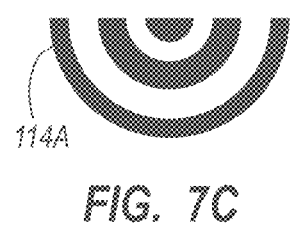
Figure 7D:
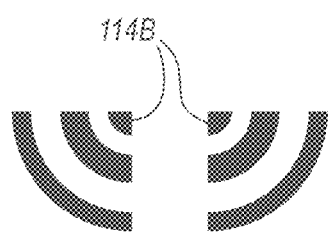
Figure 7E:
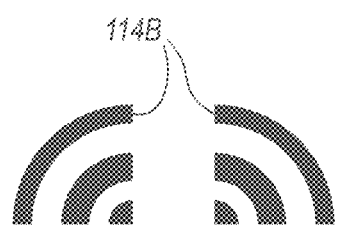

FIGS. 6 and 7A-7E show examples of icons that can be used by the console display 30 to depict detection of the stylet magnetic elements 106 by the TLS sensor 50. In particular, FIG. 6 shows an icon 114 that depicts the distal portion of the stylet 100, including the magnetic elements 106 as detected by the TLS sensor 50 when the magnetic elements are positioned under the TLS sensor. As the stylet distal end 100B is substantially co-terminal with the distal end 76A of the catheter 72, the icon indicates the position and orientation of the catheter distal end. FIGS. 7A-7E show various icons that can be depicted on the on the console display 30 when the magnetic elements 106 of the stylet 100 are not positioned directly under a portion of the TLS sensor 50, but are nonetheless detected nearby. The icons can include half-icons 114A and quarter-icons 114B that are displayed according to the position of the stylet magnetic assembly, i.e., the magnetic elements 106 in the present embodiment, relative to the TLS sensor 50.

FIGS. 8A-8C depict screenshots taken from the display 30 of the system 10 while in TLS mode, showing how the magnetic assembly of the stylet 100 is depicted. The screenshot 118 of FIG. 8A shows a representative image 120 of the TLS sensor 50. Other information is provided on the display screenshot 118, including a depth scale indicator 124, status/action indicia 126, and icons 128 corresponding to the button interface 32 included on the console 20 (FIG. 8C). Though the icons 128 in the present embodiment are simply indicators to guide the user in identifying the purpose of the corresponding buttons of the button interface 32, in another embodiment the display can be made touch-sensitive so that the icons themselves can function as button interfaces and can change according to the mode the system is in.

During initial stages of catheter advancement through the patient's vasculature after insertion therein, the distal end 76A of the catheter 72, having the stylet distal end 100B substantially co-terminal therewith, is relatively distant from the TLS sensor 50. As such, the display screenshot will indicate "no signal," indicating that the magnetic field from the stylet magnetic assembly has not been detected. In FIG. 8B, the magnetic assembly proximate the stylet distal end 100B has advanced sufficiently close to the TLS sensor 50 to be detected thereby, though it is not yet under the sensor. This is indicated by the half-icon 114A shown to the left of the sensor image 120, representing the stylet magnetic assembly being positioned to the right of the TLS sensor 50 from the perspective of the patient.

In FIG. 8C, the magnetic assembly proximate the stylet distal end 100B has advanced under the TLS sensor 50 such that its position and orientation relative thereto is detected by the TLS sensor. This is indicated by the icon 114 on the sensor image 120. Note that the button icons 128 provide indications of the actions that can be performed by pressing the corresponding buttons of the console button interface 32. As such, the button icons 128 can change according to which modality the system 10 is in, thus providing flexibility of use for the button interface 32. Note further that, as the button pad 82 of the probe 40 (FIG. 3A, 3B) includes buttons 84 that mimic several of the buttons of the button interface 32, the button icons 128 on the display 30 provide a guide to the clinician for controlling the system 10 with the probe buttons 84 while remaining in the sterile field. For instance, if the clinician has need to leave TLS mode and return to US (ultrasound) mode, the appropriate control button 84 on the probe button pad 82 can be depressed, and the US mode can be immediately called up, with the display 30 refreshing to accommodate the visual information needed for US functionality, such as that shown in FIG. 4. This is accomplished without a need for the clinician to reach out of the sterile field.

Figure 9:
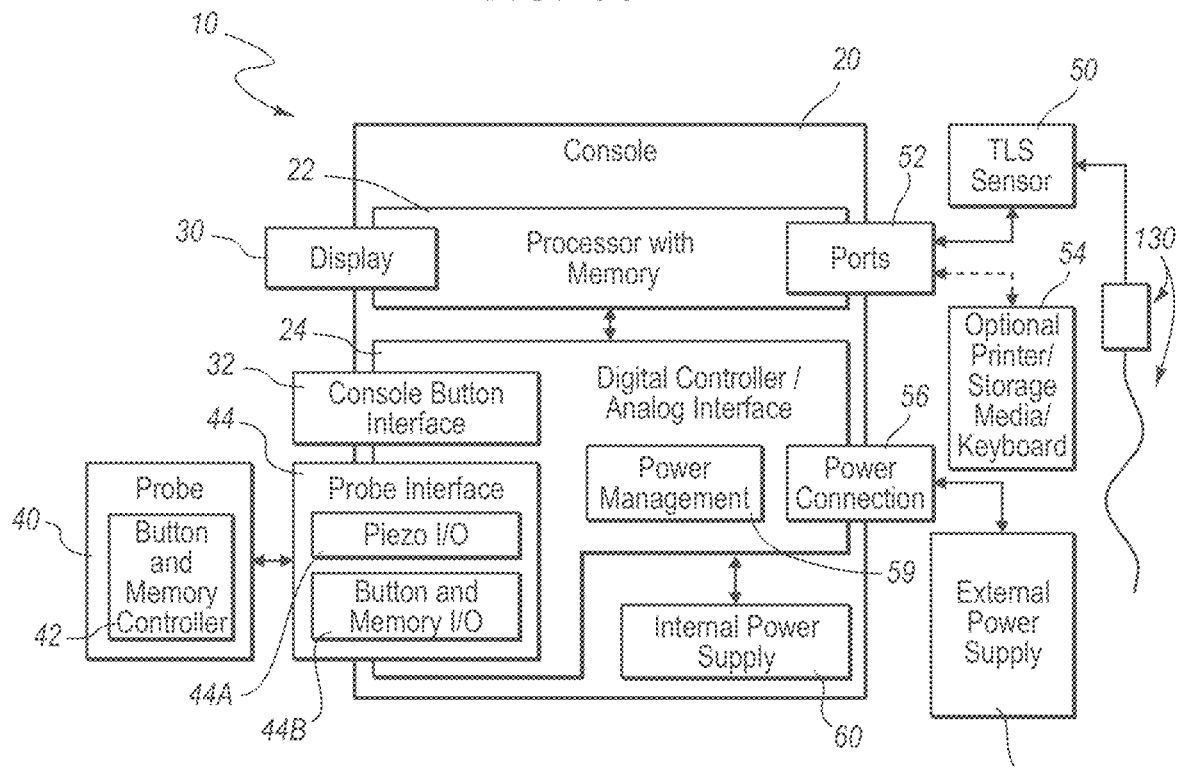
FIG. 9 is a block diagram depicting various elements of an integrated system for intravascular placement of a catheter, according to another example embodiment of the present invention.
Figure 10:
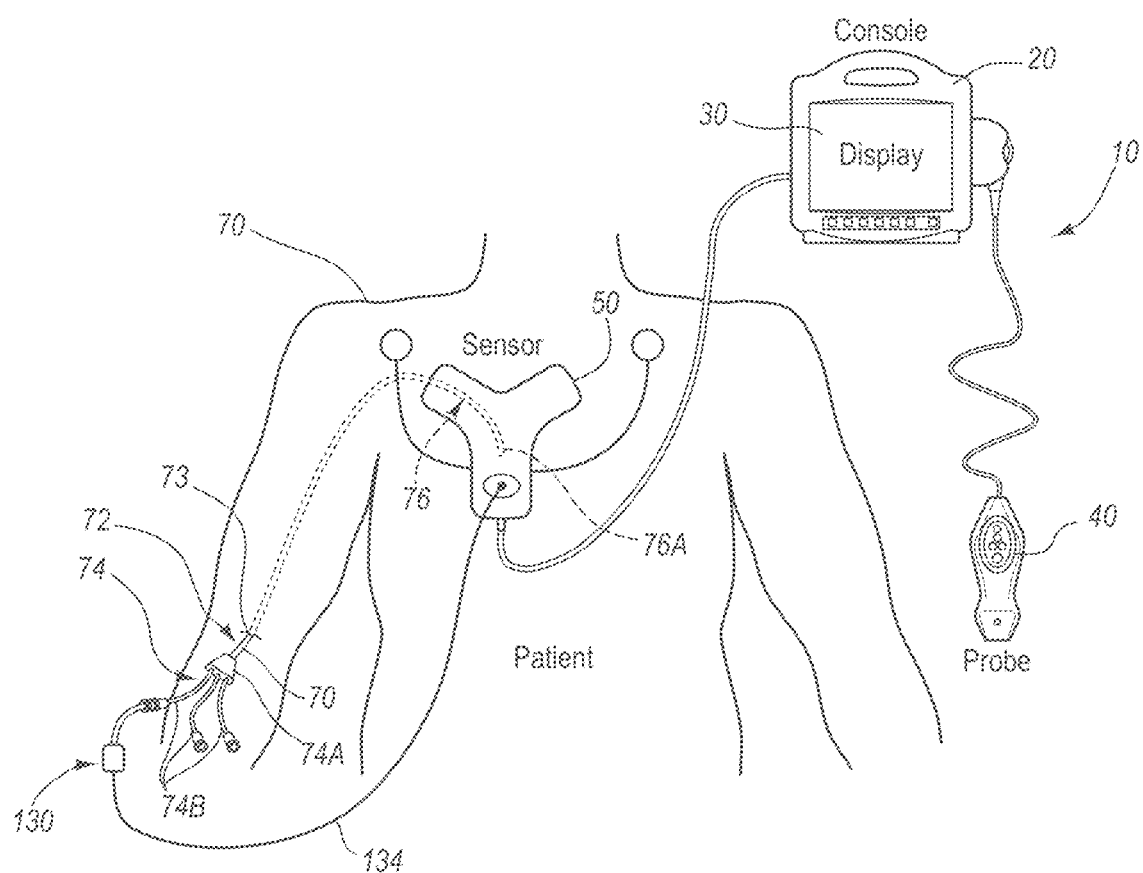
FIG. 10 is a simplified view of a patient and a catheter being inserted therein with assistance of the integrated system of FIG. 9.

Reference is now made to FIGS. 9 and 10 in describing the integrated catheter placement system 10 according to another example embodiment. As before, the integrated system 10 includes the console 20, display 30, probe 40 for US functionality, and the TLS sensor 50 for tip location functionality as described above. Note that the system 10 depicted in FIGS. 9 and 10 is similar in many respects to the system shown in FIGS. 1 and 2. As such, only selected differences will be discussed below. The system 10 of FIGS. 9 and 10 includes additional functionality wherein determination of the proximity of the catheter distal tip 76A relative to a sino-atrial ("SA") or other electrical impulse-emitting node of the heart of the patient 70 can be determined, thus providing enhanced ability to accurately place the catheter distal tip in a desired location proximate the node. Also referred to herein as "ECG" or "ECG-based tip confirmation," this third modality of the system 10 enables detection of ECG signals from the SA node in order to place the catheter distal tip in a desired location within the patient vasculature. Note that the US, TLS, and ECG modalities are seamlessly combined in the present system 10 and can be employed in concert or individually to assist in catheter placement.

FIGS. 9 and 10 show the addition to the system 10 of a stylet 130 configured in accordance with the present embodiment. As an overview, the catheter stylet 130 is removably predisposed within the lumen of the catheter 72 being inserted into the patient 70 via the insertion site 73.

The stylet 130, in addition to including a magnetic assembly for the magnetically-based TLS modality, includes an ECG sensor assembly proximate its distal end and including a portion that is co-terminal with the distal end of the catheter tip for sensing ECG signals produced by the SA node. In contrast to the previous embodiment, the stylet 130 includes a tether 134 extending from its proximal end that operably connects to the TLS sensor 50. As will be described in further detail, the stylet tether 134 permits ECG signals detected by the ECG sensor assembly included on a distal portion of the stylet 130 to be conveyed to the TLS sensor 50 during confirmation of the catheter tip location as part of the ECG signal-based tip confirmation modality. Reference and ground ECG lead/electrode pairs 158 attach to the body of the body of the patient 70 and are operably attached to the TLS sensor 50 to enable the system to filter out high level electrical activity unrelated to the electrical activity of the SA node of the heart, thus enabling the ECG-based tip confirmation functionality. Together with the reference and ground signals received from the ECG lead/electrode pairs 158 placed on the patient's skin, the ECG signals sensed by the stylet ECG sensor assembly are received by the TLS sensor 50 positioned on the patient's chest (FIG. 10). The TLS sensor 50 and/or console processor 22 can process the ECG signal data to produce an electrocardiogram waveform on the display 30, as will be described. In the case where the TLS sensor 50 processes the ECG signal data, a processor is included therein to perform the intended functionality. If the console 20 processes the ECG signal data, the processor 22, controller 24, or other processor can be utilized in the console to process the data.

Thus, as it is advanced through the patient vasculature, the catheter 72 equipped with the stylet 130 as described above can advance under the TLS sensor 50, which is positioned on the chest of the patient as shown in FIG. 10. This enables the TLS sensor 50 to detect the position of the magnetic assembly of the stylet 130, which is substantially co-terminal with the distal tip 76A of the catheter as located within the patient's vasculature. The detection by the TLS sensor 50 of the stylet magnetic assembly is depicted on the display 30 during ECG mode. The display 30 further depicts during ECG mode an ECG electrocardiogram waveform produced as a result of patient heart's electrical activity as detected by the ECG sensor assembly of the stylet 130. In greater detail, the ECG electrical activity of the SA node, including the P-wave of the waveform, is detected by the ECG sensor assembly of the stylet (described below) and forwarded to the TLS sensor 50 and console 20. The ECG electrical activity is then processed for depiction on the display 30. The clinician placing the catheter can then observe the ECG data to determine optimum placement of the distal tip 76A of the catheter 72, such as proximate the SA node in one embodiment. In one embodiment, the console 20 which includes the electronic components, such as the processor 22 (FIG. 9) necessary to receive and process the signals detected by the stylet ECG sensor assembly. In another embodiment, the TLS sensor 50 can include the necessary electronic components processing the ECG signals.

As already discussed, the display 30 is used to display information to the clinician during the catheter placement procedure. The content of the display 30 changes according to which mode the catheter placement system is in: US, TLS, or ECG. Any of the three modes can be immediately called up to the display 30 by the clinician, and in some cases information from multiple modes, such as TLS and ECG, may be displayed simultaneously. In one embodiment, as before, the mode the system is in may be controlled by the control buttons 84 included on the handheld probe 40, thus eliminating the need for the clinician to reach out of the sterile field (such as touching the button interface 32 of the console 20) to change modes. Thus, in the present embodiment the probe 40 is employed to also control some or all ECG-related functionality of the system 10. Note that the button interface 32 or other input configurations can also be used to control system functionality. Also, in addition to the visual display 30, aural information, such as beeps, tones, etc., can also be employed by the system to assist the clinician during catheter placement.

Figure 11:
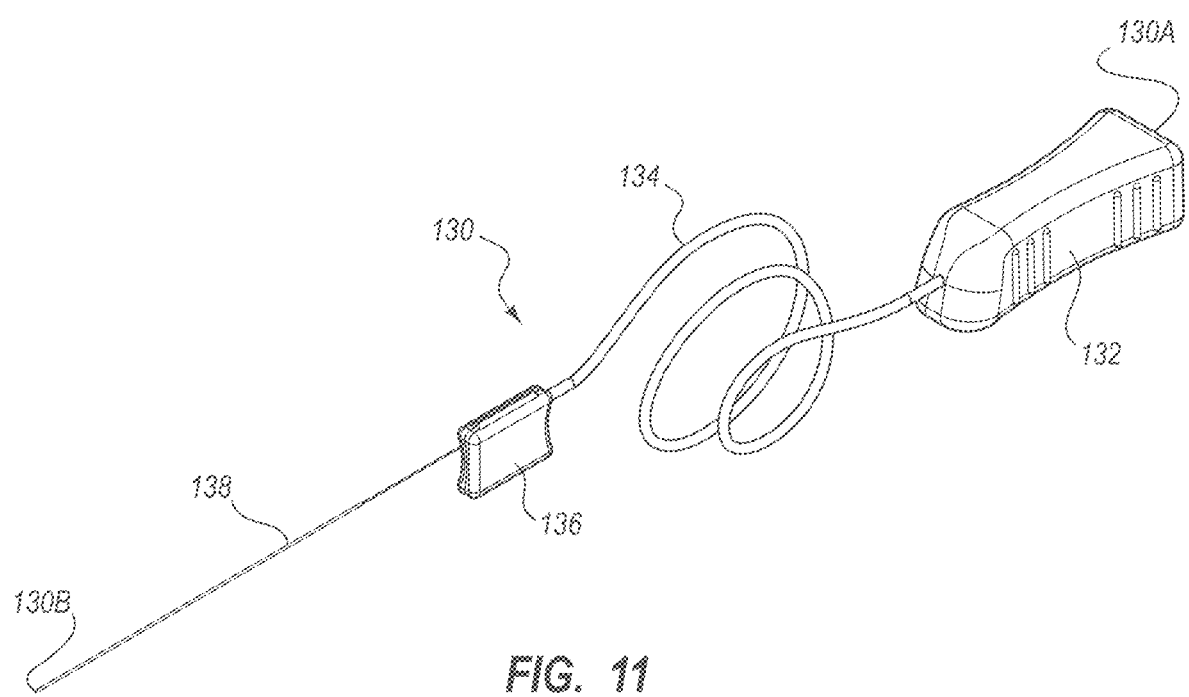
FIG. 11 is a perspective view of a stylet employed in connection with the integrated system of FIG. 9 in placing a catheter within a patient vasculature.
Figure 12A:
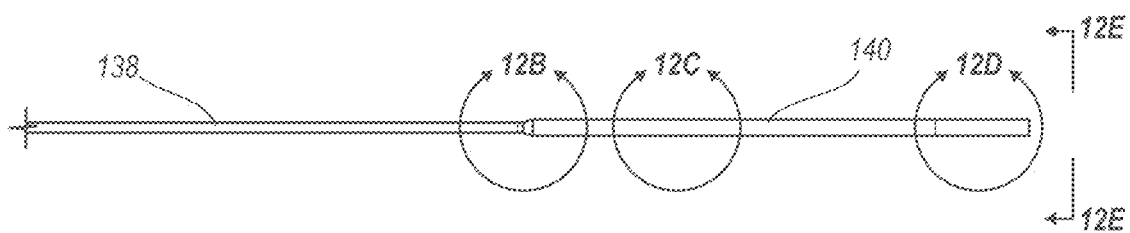
FIGS. 12A-12E are various views of portions of the stylet of FIG. 11.
Figure 12B:
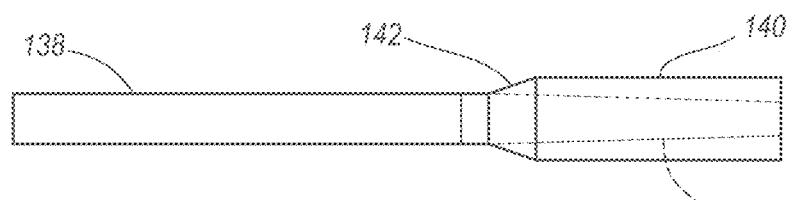
Figure 12C:
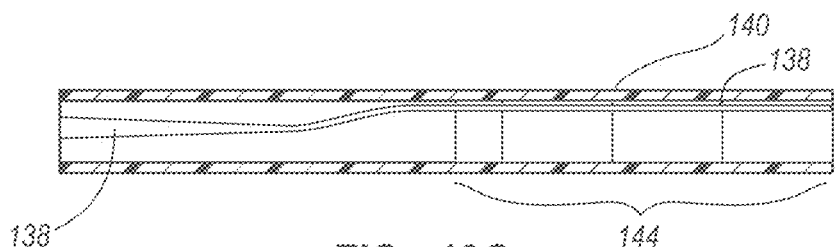
Figure 12D:
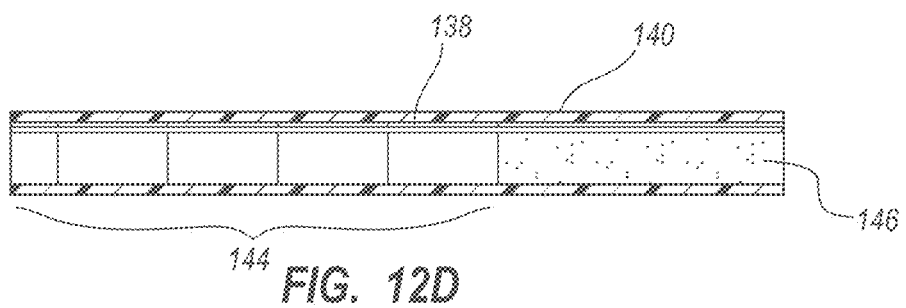
Figure 12E:
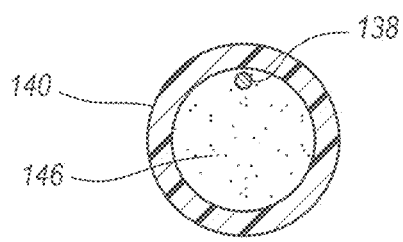

Reference is now made to FIGS. 11-12E in describing various details of one embodiment of the stylet 130 that is removably loaded into the catheter 72 and employed during insertion to position the distal tip 76A of the catheter in a desired location within the patient vasculature. As shown, the stylet 130 as removed from the catheter defines a proximal end 130A and a distal end 130B. A connector 132 is included at the proximal stylet end 130A, and a tether 134 extends distally from the connector and attaches to a handle 136. A core wire 138 extends distally from the handle 136. The stylet 130 is pre-loaded within a lumen of the catheter 72 in one embodiment such that the distal end 130B is substantially flush, or co-terminal, with the catheter opening at the distal end 76A thereof (FIG. 10), and such that a proximal portion of the core wire 138, the handle 136, and the tether 134 extend proximally from a selected one of the extension tubes 74B. Note that, though described herein as a stylet, in other embodiments a guidewire or other catheter guiding apparatus could include the principles of the embodiment described herein.

The core wire 138 defines an elongate shape and is composed of a suitable stylet material including stainless steel or a memory material such as, in one embodiment, a nickel and titanium-containing alloy commonly known by the acronym "nitinol." Though not shown here, manufacture of the core wire 138 from nitinol in one embodiment enables the portion of the core wire corresponding to a distal segment of the stylet to have a pre-shaped bent configuration so as to urge the distal portion of the catheter 72 into a similar bent configuration. In other embodiments, the core wire includes no pre-shaping. Further, the nitinol construction lends torqueability to the core wire 138 to enable a distal segment of the stylet 130 to be manipulated while disposed within the lumen of the catheter 72, which in turn enables the distal portion of the catheter to be navigated through the vasculature during catheter insertion.

The handle 136 is provided to enable insertion/removal of the stylet from the catheter 72. In embodiments where the stylet core wire 138 is torqueable, the handle 136 further enables the core wire to be rotated within the lumen of the catheter 72, to assist in navigating the catheter distal portion through the vasculature of the patient 70.

The handle 136 attaches to a distal end of the tether 134. In the present embodiment, the tether 134 is a flexible, shielded cable housing one or more conductive wires electrically connected both to the core wire 138, which acts as the ECG sensor assembly referred to above, and the tether connector 132. As such, the tether 134 provides a conductive pathway from the distal portion of the core wire 138 through to the tether connector 132 at proximal end 130A of the stylet 130. As will be explained, the tether connector 132 is configured for operable connection to the TLS sensor 50 on the patient's chest for assisting in navigation of the catheter distal tip 76A to a desired location within the patient vasculature.

As seen in FIGS. 12B-12D, a distal portion of the core wire 138 is gradually tapered, or reduced in diameter, distally from a junction point 142. A sleeve 140 is slid over the reduced-diameter core wire portion. Though of relatively greater diameter here, the sleeve in another embodiment can be sized to substantially match the diameter of the proximal portion of the stylet core wire. The stylet 130 further includes a magnetic assembly disposed proximate the distal end 130B thereof for use during TLS mode. The magnetic assembly in the illustrated embodiment includes a plurality of magnetic elements 144 interposed between an outer surface of the reduced-diameter core wire 138 and an inner surface of the sleeve 140 proximate the stylet distal end 130B. In the present embodiment, the magnetic elements 144 include 20 ferromagnetic magnets of a solid cylindrical shape stacked end-to-end in a manner similar to the stylet 100 of FIG. 2. In other embodiments, however, the magnetic element(s) may vary from this design in not only shape, but also composition, number, size, magnetic type, and position in the stylet. For example, in one embodiment the plurality of magnets of the magnetic assembly is replaced with an electromagnetic coil that produces a magnetic field for detection by the TLS sensor. These and other variations are therefore contemplated by embodiments of the present invention.

The magnetic elements 144 are employed in the stylet 130 distal portion to enable the position of the stylet distal end 130B to be observable relative to the TLS sensor 50 placed on the patient's chest. As has been mentioned, the TLS sensor 50 is configured to detect the magnetic field of the magnetic elements 144 as the stylet advances with the catheter 72 through the patient vasculature. In this way, a clinician placing the catheter 72 is able to generally determine the location of the catheter distal end 76A within the patient vasculature and detect when catheter malposition is occurring, such as advancement of the catheter along an undesired vein, for instance.

The stylet 130 further includes the afore-mentioned ECG sensor assembly, according to one embodiment. The ECG sensor assembly enables the stylet 130, disposed in a lumen of the catheter 72 during insertion, to be employed in detecting an intra-atrial ECG signal produced by an SA or other node of the patient's heart, thereby allowing for navigation of the distal tip 76A of the catheter 72 to a predetermined location within the vasculature proximate the patient's heart. Thus, the ECG sensor assembly serves as an aide in confirming proper placement of the catheter distal tip 76A.

In the embodiment illustrated in FIGS. 11-12E, the ECG sensor assembly includes a distal portion of the core wire 138 disposed proximate the stylet distal end 130B. The core wire 138, being electrically conductive, enables ECG signals to be detected by the distal end thereof and transmitted proximally along the core wire. A conductive material 146, such as a conductive epoxy, fills a distal portion of the sleeve 140 adjacent the distal termination of the core wire 138 so as to be in conductive communication with the distal end of the core wire. This in turn increases the conductive surface of the distal end 130B of the stylet 130 so as to improve its ability to detect ECG signals.

Before catheter placement, the stylet 130 is loaded into a lumen of the catheter 72. Note that the stylet 130 can come preloaded in the catheter lumen from the manufacturer, or loaded into the catheter by the clinician prior to catheter insertion. The stylet 130 is disposed within the catheter lumen such that the distal end 130B of the stylet 130 is substantially co-terminal with the distal tip 76A of the catheter 72, thus placing the distal tips of both the stylet and the catheter in substantial alignment with one another. The co-terminality of the catheter 72 and stylet 130 enables the magnetic assembly to function with the TLS sensor 50 in TLS mode to track the position of the catheter distal tip 76A as it advances within the patient vasculature, as has been described. Note, however, that for the tip confirmation functionality of the system 10, the distal end 130B of the stylet 130 need not be co-terminal with the catheter distal end 76A. Rather, all that is required is that a conductive path between the vasculature and the ECG sensor assembly, in this case the core wire 138, be established such that electrical impulses of the SA node or other node of the patient's heart can be detected. This conductive path in one embodiment can include various components including saline solution, blood, etc.

In one embodiment, once the catheter 72 has been introduced into the patient vasculature via the insertion site 73 (FIG. 10) the TLS mode of the system 10 can be employed as already described to advance the catheter distal tip 76A toward its intended destination proximate the SA node. Upon approaching the region of the heart, the system 10 can be switched to ECG mode to enable ECG signals emitted by the SA node to be detected. As the stylet-loaded catheter is advanced toward the patient's heart, the electrically conductive ECG sensor assembly, including the distal end of the core wire 138 and the conductive material 146, begins to detect the electrical impulses produced by the SA node. As such, the ECG sensor assembly serves as an electrode for detecting the ECG signals. The elongate core wire 138 proximal to the core wire distal end serves as a conductive pathway to convey the electrical impulses produced by the SA node and received by the ECG sensor assembly to the tether 134.

The tether 134 conveys the ECG signals to the TLS sensor 50 temporarily placed on the patient's chest. The tether 134 is operably connected to the TLS sensor 50 via the tether connector 132 or other suitable direct or indirect connective configuration. As described, the ECG signal can then be process and depicted on the system display 30 (FIG. 9, 10). Monitoring of the ECG signal received by the TLS sensor 50 and displayed by the display 30 enables a clinician to observe and analyze changes in the signal as the catheter distal tip 76A advances toward the SA node. When the received ECG signal matches a desired profile, the clinician can determine that the catheter distal tip 76A has reached a desired position with respect to the SA node. As mentioned, in one embodiment this desired position lies within the lower one-third ($\frac{1}{3}_{rd}$) portion of the SVC.

The ECG sensor assembly and magnetic assembly can work in concert in assisting a clinician in placing a catheter within the vasculature. Generally, the magnetic assembly of the stylet 130 assists the clinician in generally navigating the vasculature from initial catheter insertion so as to place the distal end 76A of the catheter 72 in the general region of the patient's heart. The ECG sensor assembly can then be employed to guide the catheter distal end 76A to the desired location within the SVC by enabling the clinician to observe changes in the ECG signals produced by the heart as the stylet ECG sensor assembly approaches the SA node. Again, once a suitable ECG signal profile is observed, the clinician can determine that the distal ends of both the stylet 130 and the catheter 72 have arrived at the desired location with respect to the patient's heart. Once it has been positioned as desired, the catheter 72 may be secured in place and the stylet 130 removed from the catheter lumen. It is noted here that the stylet may include one of a variety of configurations in addition to what is explicitly described herein. In one embodiment, the stylet can attach directly to the console instead of an indirect attachment via the TLS sensor. In another embodiment, the structure of the stylet 130 that enables its TLS and ECG-related functionalities can be integrated into the catheter structure itself. For instance, the magnetic assembly and/or ECG sensor assembly can, in one embodiment, be incorporated into the wall of the catheter.

FIGS. 13A-15 describe various details relating to the passage of ECG signal data from the stylet tether 134 to the TLS sensor 50 positioned on the patient's chest, according the present embodiment. In particular, this embodiment is concerned with passage of ECG signal data from a sterile field surrounding the catheter 72 and insertion site 73, which includes the stylet 130 and tether 134, and a non-sterile field, such as the patient's chest on which the TLS sensor is positioned. Such passage should not disrupt the sterile field so that the sterility thereof is compromised. A sterile drape that is positioned over the patient 70 during the catheter insertion procedure defines the majority of the sterile field: areas above the drape are sterile, while areas below (excluding the insertion site and immediately surrounding region) are non-sterile. As will be seen, the discussion below includes at least a first communication node associated with the stylet 130, and a second communication node associated with the TLS sensor 50 that operably connect with one another to enable ECG signal data transfer therebetween.

Figure 13A:
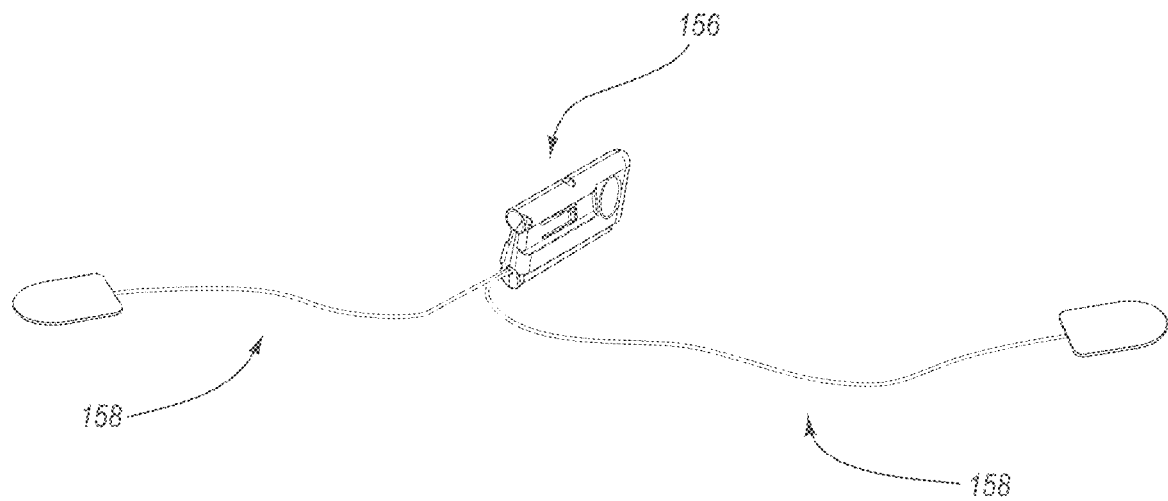
FIGS. 13A-13D are various views of a fin connector assembly for use with the integrated system of FIG. 9.
Figure 13B:
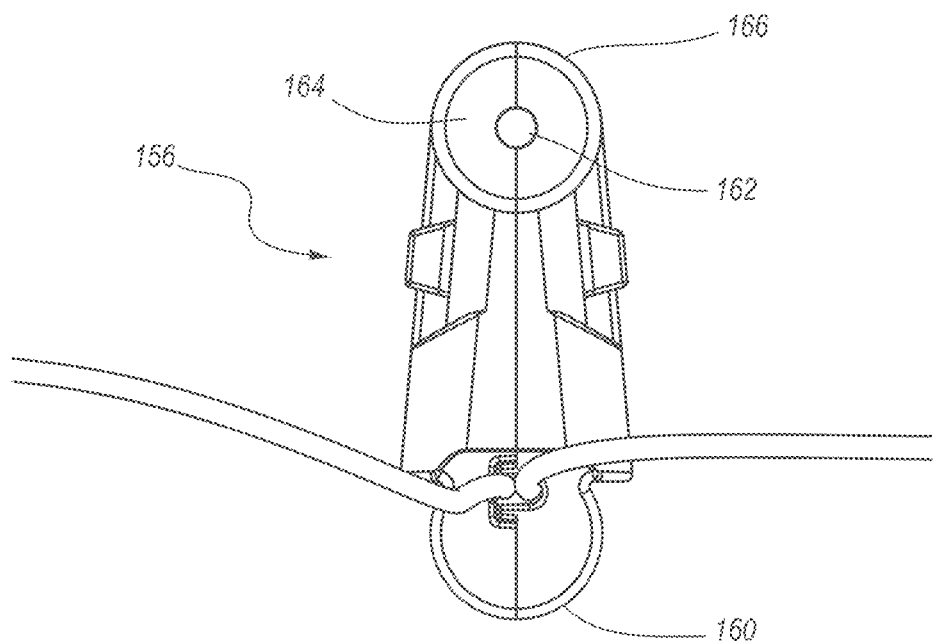
Figure 13C:
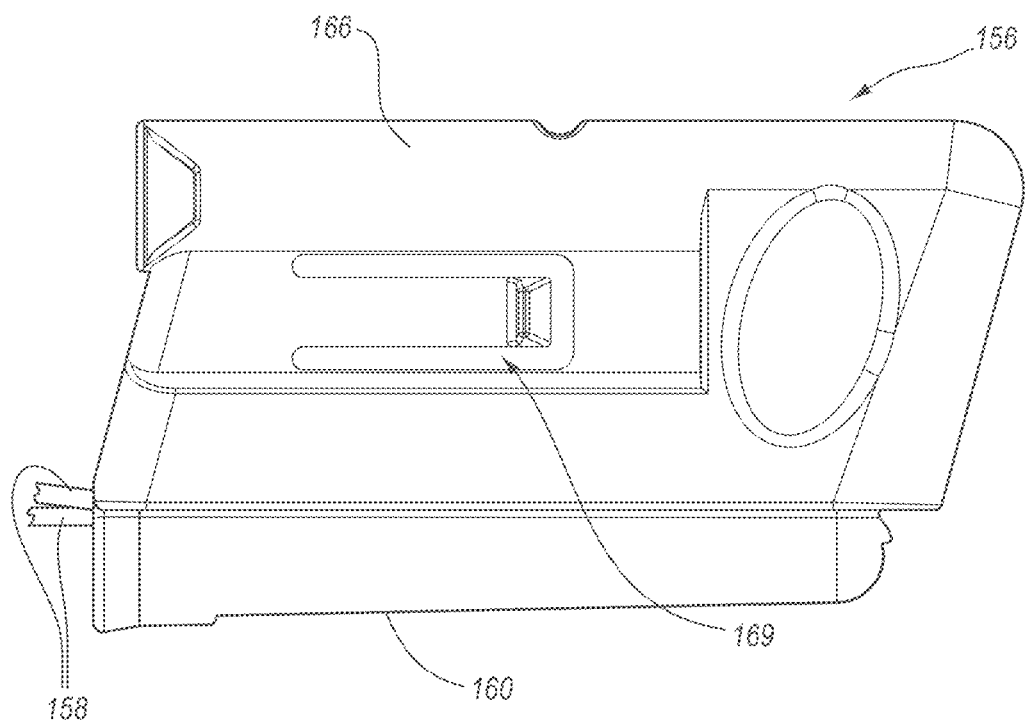
Figure 13D:
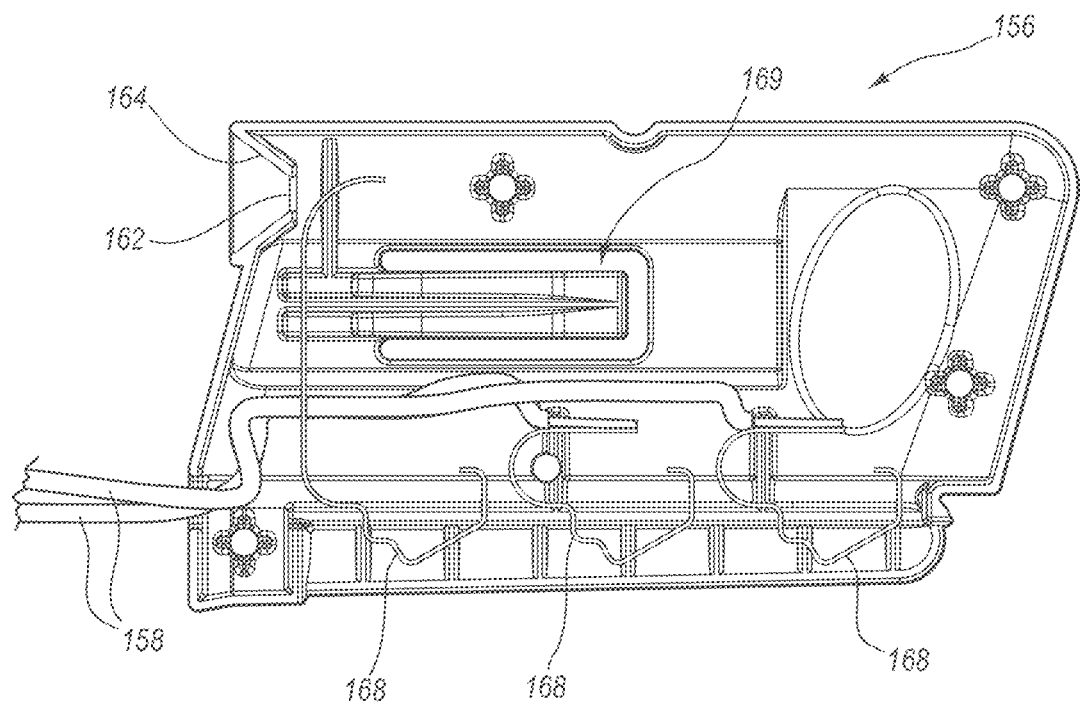
Figure 14A:
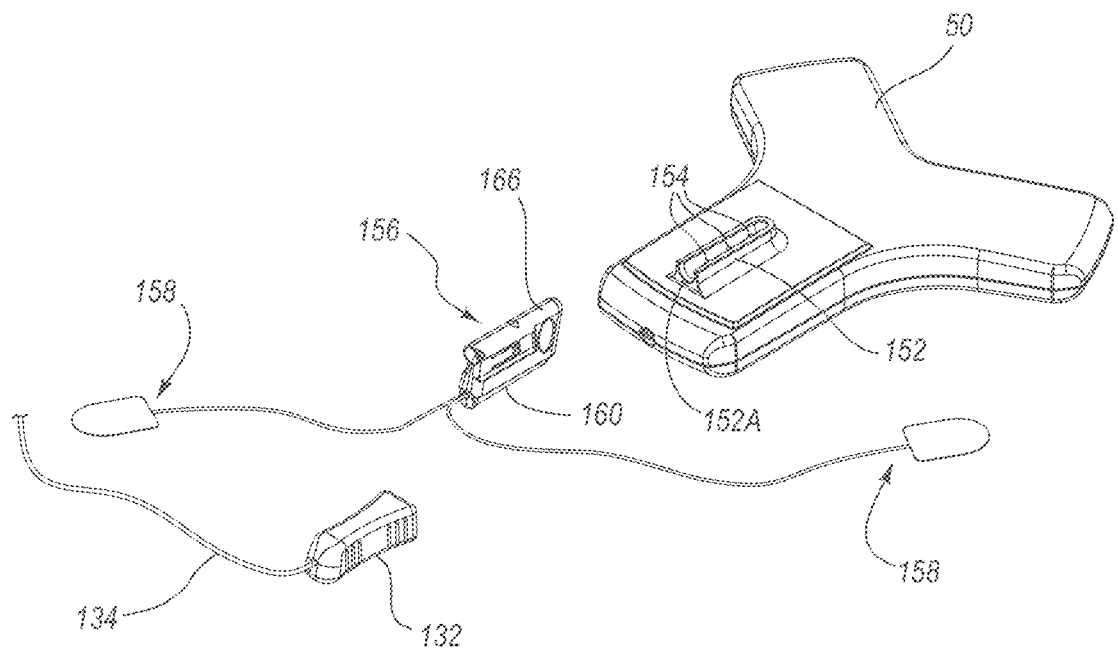
FIGS. 14A-14C are views showing the connection of a stylet tether and fin connector to a sensor of the integrated system of FIG. 9.
Figure 14B:
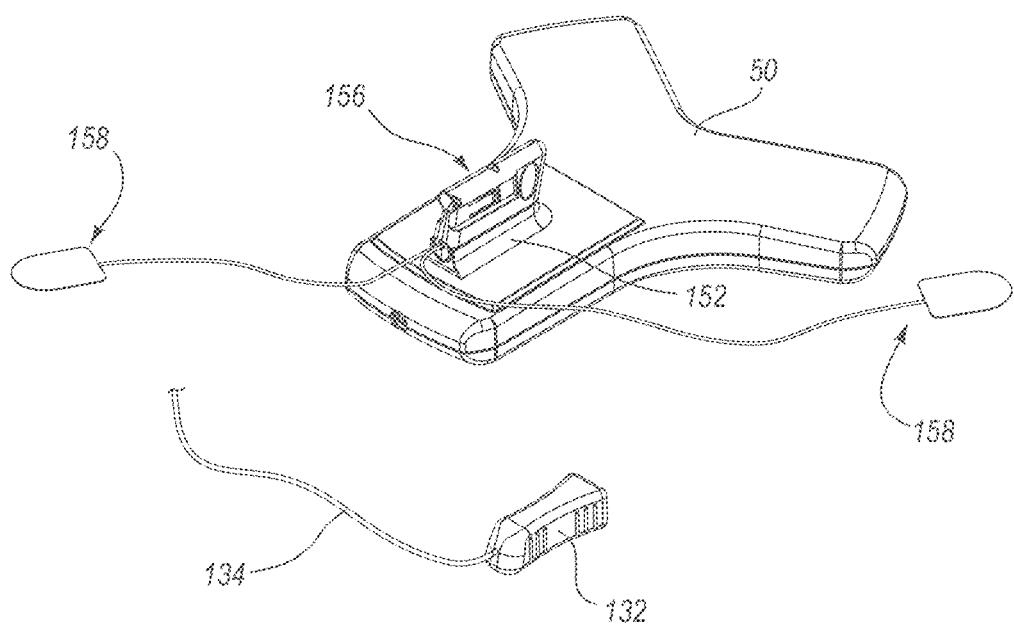
Figure 14C:
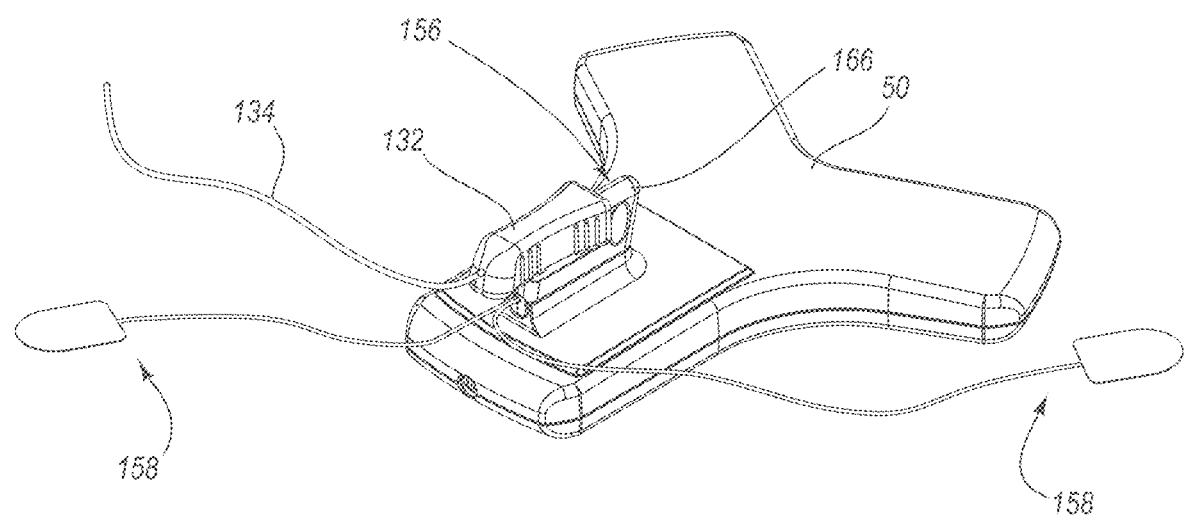
Figure 15:
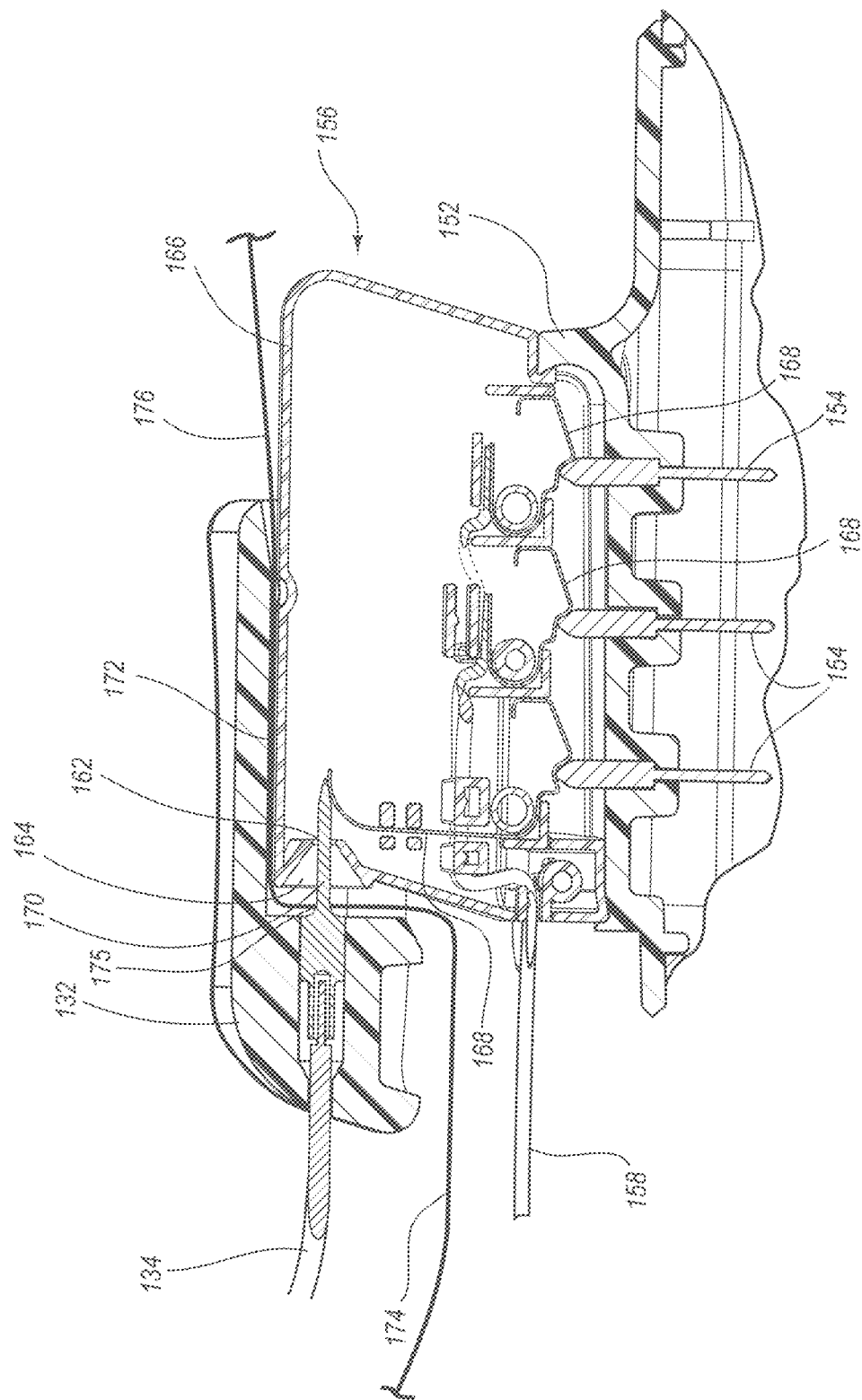
FIG. 15 is a cross sectional view of the connection of the stylet tether, fin connector, and sensor shown in FIG. 14C.

One embodiment addressing the passage of ECG signal data from the sterile field to the non-sterile field without compromising the sterility of the former is depicted in FIGS. 13A-15, which depict a "through-drape" implementation also referred to as a "shark fin" implementation. In particular, FIG. 14A shows the TLS sensor 50 as described above for placement on the chest of the patient during a catheter insertion procedure. The TLS sensor 50 includes on a top surface thereof a connector base 152 defining a channel 152A in which are disposed three electrical base contacts 154. A fin connector 156, also shown in FIGS. 13A-13D, is sized to be slidingly received by the channel 152A of the connector base 152, as shown in FIGS. 14B and 15. Two ECG lead/electrode pairs 158 extend from the fin connector 156 for placement on the shoulder and torso or other suitable external locations on the patient body. The drape-piercing tether connector 132 is configured to slidingly mate with a portion of the fin connector 156, as will be described further below, to complete a conductive pathway from the stylet 120, through the sterile field to the TLS sensor 50.

FIGS. 13A-13D show further aspects of the fin connector 156. In particular, the fin connector 156 defines a lower barrel portion 160 that is sized to be received in the channel 152A of the connector base 152 (FIGS. 14B, 15). A hole 162 surrounded by a centering cone 164 is included on a back end of an upper barrel portion 166. The upper barrel portion 166 is sized to receive the tether connector 132 of the stylet 130 (FIGS. 14C, 15) such that a pin contact 170 extending into a channel 172 of the tether connector 132 (FIG. 15) is guided by the centering hole until it seats within the hole 162 of the fin connector 156, thus interconnecting the tether connector with the fin connector. An engagement feature, such as the engagement feature 169 shown in FIGS. 13C and 13D, can be included on the fin connector 156 to engage with a corresponding feature on the tether connector 132 to assist with maintaining a mating between the two components.

FIG. 13D shows that the fin connector 156 includes a plurality of electrical contacts 168. In the present embodiment, three contacts 168 are included: the two forward-most contact each electrically connecting with a terminal end of one of the ECG leads 158, and the rear contact extending into axial proximity of the hole 162 so as to electrically connect with the pin contact 170 of the tether connector 132 when the latter is mated with the fin connector 156 (FIG. 15). A bottom portion of each contact 168 of the fin connector 156 is positioned to electrically connect with a corresponding one of the base contacts 154 of the TLS sensor connector base 152.

FIG. 14B shows a first connection stage, wherein the fin connector 156 is removably mated with the TLS sensor connector base 152 by the sliding engagement of the lower barrel portion 160 of the fin connector with the connector base channel 152A. This engagement electrically connects the connector base contacts 154 with the corresponding fin contacts 168.

FIG. 14C shows a second connection stage, wherein the tether connector 132 is removably mated with the fin connector 156 by the sliding engagement of the tether connector channel 172 with the upper barrel portion 166 of the fin connector. This engagement electrically connects the tether connector pin contact 170 with the back contact 168 of the fin connector 156, as best seen in FIG. 15. In the present embodiment, the horizontal sliding movement of the tether connector 132 with respect to the fin connector 156 is in the same engagement direction as when the fin connector is slidably mated to the sensor connector base channel 152A (FIG. 14B). In one embodiment, one or both of the stylet 130/tether connector 132 and the fin connector 156 are disposable. Also, the tether connector in one embodiment can be mated to the fin connector after the fin connector has been mated to the TLS sensor, while in another embodiment the tether connector can be first mated to the fin connector through the surgical drape before the fin connector is mated to the TLS sensor.

In the connection scheme shown in FIG. 14C, the stylet 130 is operably connected to the TLS sensor 50 via the tether connector 132, thus enabling the ECG sensor assembly of the stylet to communicate ECG signals to the TLS sensor. In addition, the ECG lead/electrode pairs 158 are operably connected to the TLS sensor 50. In one embodiment, therefore, the tether connector 132 is referred to as a first communication node for the stylet 130, while the fin connector 156 is referred to as a second communication node for the TLS sensor 50.

Note that various other connective schemes and structures can be employed to establish operable communication between the stylet and the TLS sensor. For instance, the tether connector can use a slicing contact instead of a pin contact to pierce the drape. Or, the fin connector can be integrally formed with the TLS sensor. These and other configurations are therefore embraced within the scope of embodiments of the present disclosure.

As seen in FIG. 15, a sterile drape 174 used during catheter placement to establish a sterile field is interposed between the interconnection of the tether connector 132 with the fin connector 156. As just described, the tether connector 132 includes the pin contact 170 that is configured to pierce the drape 174 when the two components are mated. This piercing forms a small hole, or perforation 175, in the sterile drape 174 that is occupied by the pin contact 170, thus minimizing the size of the drape perforation by the pin contact. Moreover, the fit between the tether connector 132 and the fin connector 156 is such that the perforation in sterile drape made by piercing of the pin contact 170 is enclosed by the tether connector channel 172, thus preserving the sterility of the drape and preventing a breach in the drape that could compromise the sterile field established thereby. The tether connector channel 172 is configured so as to fold the sterile drape 174 down prior to piercing by the pin contact 170 such that the pin contact does not pierce the drape until it is disposed proximate the hole 162 of the fin connector 156. It is noted here that the tether connector 132 and fin connector 156 are configured so as to facilitate alignment therebetween blindly through the opaque sterile drape 174, i.e., via palpation absent visualization by the clinician of both components.

Note further that the fin contacts 168 of the fin connector 156 as shown in FIG. 15 are configured to mate with the sensor base contacts 154 in such a way as to assist in retaining the fin connector in engagement with the sensor base channel 152A. This in turn reduces the need for additional apparatus to secure the fin connector 156 to the TLS sensor 50.

Figure 16:
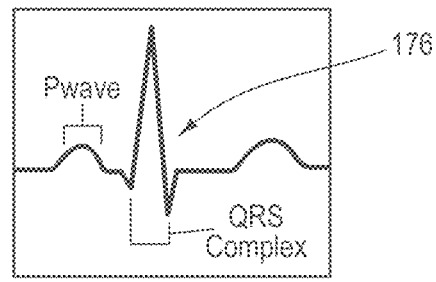
FIG. 16 is simplified view of an ECG trace of a patient.

FIG. 16 shows a typical ECG waveform 176, including a P-wave and a QRS complex. Generally, the amplitude of the P-wave varies as a function of distance of the ECG sensor assembly from the SA node, which produces the waveform 176. A clinician can use this relationship in determining when the catheter tip is properly positioned proximate the heart. For instance, in one implementation the catheter tip is desirably placed within the lower one-third ($\frac{1}{3}_{rd}$) of the superior vena cava, as has been discussed. The ECG data detected by the ECG sensor assembly of the stylet 130 is used to reproduce waveforms such as the waveform 176, for depiction on the display 30 of the system 10 during ECG mode.

Figure 17:
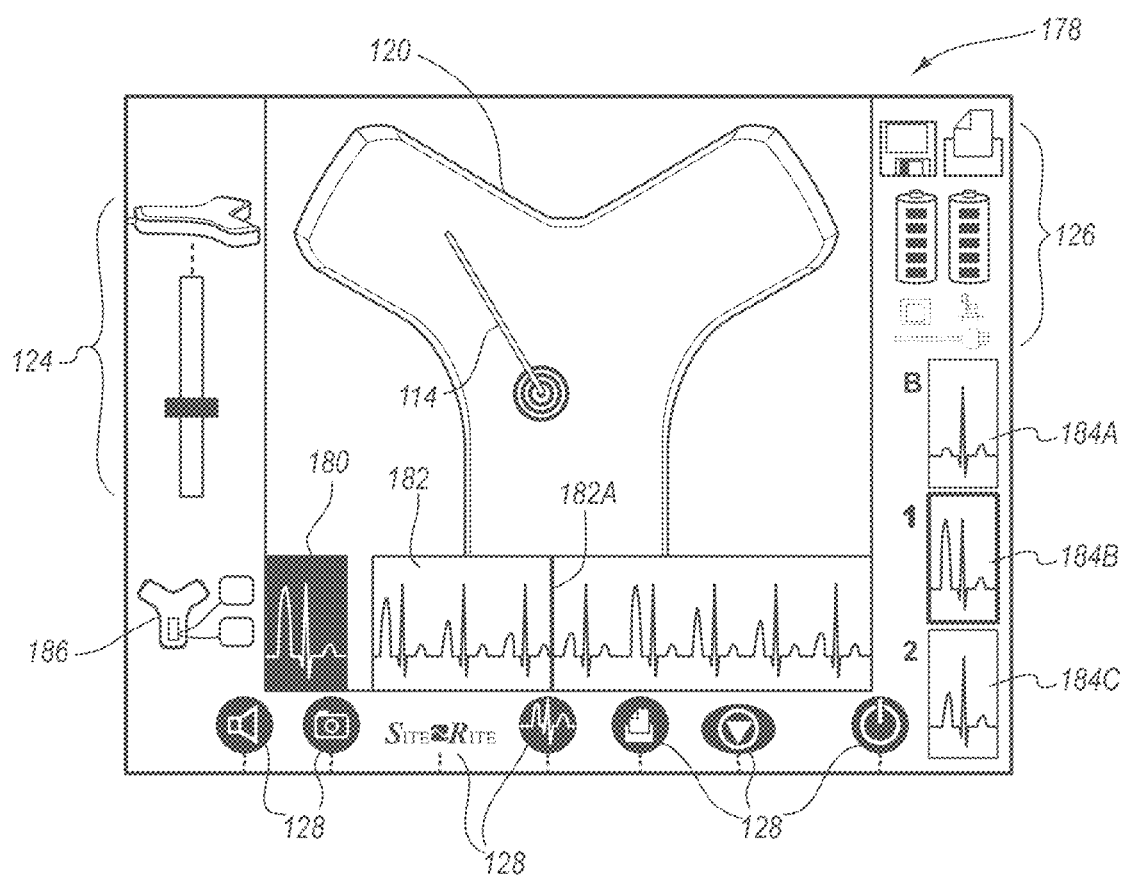
FIG. 17 is a screenshot of an image depicted on a display of the integrated system of FIG. 9 during catheter tip placement procedures.

Reference is now made to FIG. 17 in describing display aspects of ECG signal data on the display 30 when the system 10 is in ECG mode, the third modality described further above, according to one embodiment. The screenshot 178 of the display 30 includes elements of the TLS modality, including a representative image 120 of the TLS sensor 50, and can the icon 114 corresponding to the position of the distal end of the stylet 130 during transit through the patient vasculature. The screenshot 178 further includes a window 180 in which the current ECG waveform captured by the ECG sensor assembly of the stylet 130 and processed by the system 10 is displayed. The window 180 is continually refreshed as new waveforms are detected.

Window 182 includes a successive depiction of the most recent detected ECG waveforms, and includes a refresh bar 182A, which moves laterally to refresh the waveforms as they are detected. Window 184A is used to display a baseline ECG waveform, captured before the ECG sensor assembly is brought into proximity with the SA node, for comparison purposes to assist the clinician in determining when the desired catheter tip location has been achieved. Windows 184B and 184C can be filed by user-selected detected ECG waveforms when the user pushes a predetermined button on the probe 40 or the console button interface 32. The waveforms in the windows 184B and 184C remain until overwritten by new waveforms as a result of user selection via button pushes or other input. As in previous modes, the depth scale 124, status/action indicia 126, and button icons 128 are included on the display 30. An integrity indicator 186 is also included on the display 30 to give an indication of whether the ECG lead/electrode pairs 158 are operably connected to the TLS sensor 50.

As seen above, therefore, the display 30 depicts in one embodiment elements of both the TLS and ECG modalities simultaneously on a single screen, thus offering the clinician ample data to assist in placing the catheter distal tip in a desired position. Note further that in one embodiment a printout of the screenshot or selected ECG or TLS data can be saved, printed, or otherwise preserved by the system 10 to enable documentation of proper catheter placement.

Although the embodiments described herein relate to a particular configuration of a catheter, such as a PICC or CVC, such embodiments are merely exemplary. Accordingly, the principles of the present invention can be extended to catheters of many different configurations and designs.

Embodiments of the invention may be embodied in other specific forms without departing from the spirit of the present disclosure. The described embodiments are to be considered in all respects only as illustrative, not restrictive. The scope of the embodiments is, therefore, indicated by the appended claims rather than by the foregoing description. All changes that come within the meaning and range of equivalency of the claims are to be embraced within their scope.

What is claimed is:

1. A catheter placement system, comprising:
   a catheter assembly, comprising:
      a catheter;
      a magnetic component producing a magnetic field; and
      an electrocardiogram (ECG) sensor designed to measure an intravascular ECG signal;
   an external ultrasound probe including user input controls;
   a tip location sensor including a housing designed to be positioned on a chest of a patient, the tip location sensor configured to:
      detect the magnetic field of the magnetic component when the catheter is disposed in the patient, the magnetic field providing magnetic field information for locating the magnetic component relative to the tip location sensor; and
      receive the intravascular ECG signal from the ECG sensor,
      wherein the housing comprises:
         a trunk designed to be positioned offset from and parallel to a sagittal plane of the patient;
         a first branch extending from the trunk in a first direction designed to be toward a first side of the patient relative to the sagittal plane of the patient when the trunk is positioned parallel to the sagittal plane of the patient; and
         a second branch extending from the trunk in a second direction designed to be toward a second side of the patient relative to the sagittal plane of the patient when the trunk is positioned parallel to the sagittal plane of the patient; and
   a set of electrodes coupled to the tip location sensor and designed to be placed on the chest of the patient and generate a reference waveform electrocardiogram (ECG), wherein the set of electrodes includes a first external electrode and a second external electrode; and
   a console coupled to the tip location sensor, the console comprising a processor and a display configured to show:
      an image from the external ultrasound probe;
      a graphical representation of the magnetic component from the detected magnetic field; and
      successive ECG waveforms from the intravascular ECG signal.

2. The catheter placement system according to claim 1, wherein the successive ECG waveforms change in relation to proximity of a distal tip of the catheter to a sinoatrial (SA) node of the patient.

3. The catheter placement system according to claim 1, wherein the user input controls are control buttons on a button pad, and wherein one or more of the control buttons function to select content on the display.

4. The catheter placement system according to claim 1, wherein the display is configured to simultaneously show the graphical representation of the magnetic component and the successive ECG waveforms.

5. The catheter placement system according to claim 1, wherein the magnetic component and the ECG sensor are incorporated into a stylet.

6. The catheter placement system according to claim 5, wherein the magnetic component comprises a plurality of magnetic elements.

7. The catheter placement system according to claim 6, wherein the plurality of magnetic elements are positioned adjacent one another along a distal portion of the stylet.

8. The catheter placement system according to claim 7, wherein the stylet includes a core wire, and wherein a distal portion of the core wire includes the ECG sensor.

9. The catheter placement system according to claim 8, wherein the distal portion of the core wire is distal to the plurality of magnetic elements.

10. The catheter placement system according to claim 9, wherein a distal end of the stylet includes a conductive epoxy in contact with the distal portion of the core wire.

11. The catheter placement system according to claim 9, wherein the stylet comprises a tether including one or more conductive wires in communication with the core wire, the tether providing a conductive pathway for the ECG sensor.

12. The catheter placement system according to claim 1, further comprising an external ECG connector coupled to the first external electrode and the second external electrode, the external ECG connector designed to operably couple to the tip location sensor and designed to couple the set of electrodes to the tip location sensor.

13. The catheter placement system according to claim 12, wherein the tip location sensor includes a channel designed to slidingly receive the external ECG connector.

14. The catheter placement system according to claim 1, and wherein the display is configured to show the reference waveform ECG.

15. A catheter placement system, comprising:
a tip location sensor including a housing designed to be positioned on a chest of a patient,
the housing comprising:
a trunk designed to be positioned offset from and parallel to a sagittal plane of the patient;
a first branch extending from the trunk in a first direction designed to be toward a first side of the patient relative to the sagittal plane of the patient when the trunk is positioned parallel to the sagittal plane of the patient; and
a second branch extending from the trunk in a second direction designed to be toward a second side of the patient relative to the sagittal plane of the patient when the trunk is positioned parallel to the sagittal plane of the patient; and
a set of electrodes coupled to the tip location sensor and designed to be placed on the chest of the patient and generate a reference waveform electrocardiogram (ECG), wherein the set of electrodes includes a first external electrode and a second external electrode;
a catheter assembly, comprising:
a catheter including a lumen; and
a stylet designed for insertion into the lumen, the stylet including:
a magnetic element producing a magnetic field for tracking through a body of the patient;
an ECG sensor for measuring an intravascular ECG signal, wherein the tip location sensor is configured to:
detect the magnetic field of a magnetic component when the catheter is disposed in the patient, the magnetic field providing magnetic field information for locating the magnetic component relative to the tip location sensor; and
receive the intravascular ECG signal from the ECG sensor; and
a console coupled to the tip location sensor, the console comprising a processor and a display configured to show:
a graphical representation of the catheter from the detected magnetic field; and
successive ECG waveforms from an intervascular ECG signal.

16. The catheter placement system according to claim 15, further comprising an external ECG connector coupled to the first external electrode and the second external electrode, the external ECG connector coupled to the tip location sensor and designed to couple the set of electrodes to the tip location sensor.

17. The catheter placement system according to claim 15, further comprising an input control device designed to communicate with the console.

18. The catheter placement system according to claim 17, wherein the input control device comprises control buttons on a button pad, and wherein one or more of the control buttons function to select content on the display.

19. The catheter placement system according to claim 15, wherein the stylet includes a core wire, and wherein a distal portion of the core wire includes the ECG sensor.

* * * * *